US007269310B2

(12) United States Patent
Suzuki et al.

(10) Patent No.: US 7,269,310 B2
(45) Date of Patent: Sep. 11, 2007

(54) OPTICAL CONNECTOR, OPTICAL COUPLING METHOD AND OPTICAL ELEMENT

(75) Inventors: Akiko Suzuki, Akishima (JP); Akinobu Sato, Soka (JP); Emmanuel Bourelle, Musashimurayama (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 65 days.

(21) Appl. No.: 11/369,356

(22) Filed: Mar. 6, 2006

(65) Prior Publication Data

US 2006/0204173 A1    Sep. 14, 2006

(30) Foreign Application Priority Data

Mar. 8, 2005  (JP) .............................. 2005-064233

(51) Int. Cl.
*G02B 6/26* (2006.01)

(52) U.S. Cl. ............................ 385/15; 385/31; 385/42; 385/50; 385/129

(58) Field of Classification Search .................. 385/15
See application file for complete search history.

(56) References Cited

U.S. PATENT DOCUMENTS

2003/0185532 A1* 10/2003 Hosomi et al. ............. 385/129

FOREIGN PATENT DOCUMENTS

JP    2001-272555    10/2001

* cited by examiner

*Primary Examiner*—Frank G. Font
*Assistant Examiner*—Mary El-Shammaa
(74) *Attorney, Agent, or Firm*—David N. Lathrop, Esq.; Gallagher & Lathrop

(57) ABSTRACT

An optical connector used for inputting light to an optical element from an external optical system or outputting light from an optical element to an external optical system includes a photonic crystal having a periodic refractive index structure, and an optical waveguide to be optically coupled to the optical element and a region in which a plurality of defects are formed at intervals equal to or less than four times the refractive index period a of the photonic crystal are formed in the photonic crystal. The region has a size equal to or greater than the wavelength of the light input from the external optical system or the wavelength of the light output to the external optical system, and the external optical system and the optical waveguide are optically coupled to each other via the region. The optical connector has an improved optical coupling efficiency, can achieve optical coupling of a plurality of light components of different wavelengths, and can readily achieve alignment.

11 Claims, 23 Drawing Sheets

OPTICAL CONNECTOR, OPTICAL COUPLING METHOD AND OPTICAL ELEMENT

BACKGROUND OF THE INVENTION

The present invention relates to an optical connector using a photonic crystal that can be used for optically coupling an external optical system, such as an optical fiber, and an optical element using a photonic crystal, an optical coupling method, and an optical element incorporating the optical connector.

Photonic crystals composed of a periodic array of two or more materials of difference refractive indices are drawing attention because they can highly control the behavior of light. Photonic crystals allow light to be efficiently confined in a spatial domain that is no greater than the wavelength or to be refracted at a steep angle with low loss, so that the optical element can be significantly smaller than conventional. Confinement of light can be most efficiently achieved by using a three-dimensional photonic crystal. However, it is difficult for the existing processing art to precisely fabricate a fine periodic structure on the order of 1 µm, such as a wavelength range for optical communications, and thus, application of a two-dimensional photonic crystal to various devices is being contemplated.

For example, the periodic refractive index structure of a two-dimensional photonic crystal is composed of a high-refractive-index material, such as silicon, and a square lattice array or triangular lattice array of cylindrical holes (holes in the form of a cylinder) made of a low-refractive-index material, such as air, formed therein. Such a periodic structure provides a photonic band gap, and propagation of in-plane light is controlled. On the other hand, the two-dimensional periodic structure cannot control vertical propagation of light in a direction perpendicular to the in-plane direction. Thus, the two-dimensional periodic structure is made in a slab form, and layers of a low-refractive-index material, such as air, are provided above and below the two-dimensional periodic structure, thereby allowing vertical confinement of light by the total reflection due to the difference in refractive index.

If a line defect (formed by eliminating a row of cylindrical holes made of a low-refractive-index material) is formed in the periodic refractive-index structure of the two-dimensional photonic crystal slab, there can be provided an optical waveguide that can propagate light with low loss owing to the periodic structure in the in-plane direction and the total reflection in the vertical direction. Thus, it is expected that an ultra-compact optical integrated circuit can be provided by integrating optical functional elements, such as an optical waveguide and an optical filter, in a photonic crystal.

In order to put an optical element using a photonic crystal into practical use, the optical element has to be capable of being optically coupled to an external optical system, such as an optical fiber. As a light introducing section of the two-dimensional photonic crystal slab, the line defect optical waveguide described above is popular. As a method of optically coupling external light to the line defect optical waveguide, Japanese Patent Application Laid-Open No. 2001-272555 (issued on Oct. 5, 2001, referred to as literature 1, hereinafter) discloses an art of externally inputting light perpendicularly to a surface of a two-dimensional photonic crystal slab, thereby optically coupling the light to the slab surface.

Specifically, according to the method described in the literature 1, a point defect that disturbs the periodic refractive index arrangement is formed in the two-dimensional photonic crystal slab, and light is input to a line defect optical waveguide via the point defect or externally output from the line defect optical waveguide via the point defect. The point defect is formed by changing the diameter of a cylindrical hole (air hole) in the periodic refractive index structure, and light that can be input or output via the point defect is limited to light having a particular wavelength that depends on the shape (diameter) of the point defect. Thus, if a plurality of point defects having different shapes are formed in the photonic crystal, light of different wavelengths can be input to or output from the line defect optical waveguide via the respective point defects.

However, the method of coupling light perpendicularly to the slab surface via a point defect formed in the two-dimensional photonic crystal slab described in the literature 1 has a problem that the optical coupling efficiency is extremely low because the size of the point defect (having a diameter of about 0.5 µm, for example) is extremely smaller than the mode size (about 10 µm, for example) of the external optical system, such as an optical fiber. In addition, since the method is intended for selective coupling of only light of a single wavelength by controlling the shape of the point defect, there is a problem that light containing components of different wavelengths from one optical fiber cannot be coupled to the optical waveguide, for example. Furthermore, there is a problem that the optical fiber has to be accurately aligned with the point defect in the plane of the two-dimensional photonic crystal slab.

That is, there have not been proposed an optical connector or an optical coupling method that improve the optical coupling efficiency, which is reduced because of the difference between the size of the point defect and the light mode size of the external optical system, can couple a plurality of light components of different wavelengths from one optical fiber to the line defect optical waveguide in the two-dimensional photonic crystal slab, and can readily achieve alignment, that is, can maintain a constant optical coupling efficiency even if the relative position of the optical fiber with respect to the two-dimensional photonic crystal slab is shifted by several micrometers or more.

SUMMARY OF THE INVENTION

An object of the present invention is to provide an optical connector and an optical coupling method that can improve the optical coupling efficiency to an external optical system, such as an optical fiber, which has a large mode diameter, can achieve optical coupling of a plurality of light components of different wavelengths, and significantly relax the precision requirement of alignment with an external optical system.

According to the present invention, there is provided an optical connector used for inputting light to an optical element from an external optical system or outputting light from an optical element to an external optical system, comprising: a photonic crystal having a periodic refractive index structure, in which an optical waveguide to be optically coupled to the optical element and a region in which a plurality of defects are formed at intervals equal to or less than four times the refractive index period of the photonic crystal are formed in the photonic crystal, the external optical system and the optical waveguide are optically coupled to each other via the region, and the region has a size equal to or greater than the wavelength of the light input from the external optical system or the wavelength of the light output to the external optical system.

According to an optical coupling method according to the present invention, in a photonic crystal having a periodic refractive index structure, an optical waveguide and a region in which a plurality of defects are formed at intervals equal to or less than four times the refractive index period of the photonic crystal are formed, the region having a size equal to or greater than the wavelength of light input from an optical fiber or output to an optical fiber. Then, light containing a plurality of components of different wavelengths is input to the region from one optical fiber opposed to the region, and the plurality of components of different wavelengths of the incident light are optically coupled to the optical waveguide from the region. Alternatively, a plurality of components of different wavelengths of light having propagated through the optical waveguide are optically coupled to the region, and the light containing the plurality of components of different wavelengths is output from the region to one optical fiber opposed to the region.

Having the structure described above, the optical connector according to the present invention has an improved optical coupling efficiency than conventional when coupling light from an external optical system having a large mode diameter, such as an optical fiber, to the optical waveguide in the photonic crystal. In addition, while only light of a single wavelength can be optically coupled via a defect conventionally, according to the present invention, light containing a plurality of components of different wavelengths can be optically coupled via a region that has an array of a plurality of defects formed therein and has a size no less than the wavelength of the input or output light. Furthermore, alignment for optical coupling can be achieved more readily than conventional.

DETAILED DESCRIPTION OF THE PREFERRED EMBODIMENTS

In the following, embodiments of the present invention will be described. In all the embodiments, a two-dimensional photonic crystal slab is used. First, a method of fabricating a two-dimensional photonic crystal slab will be described step by step.

(1) A silicon-on-insulator (SOI) substrate, which comprises a stack of a silicon substrate, an oxide film overlying the silicon substrate and a silicon film overlying the oxide film, is prepared.

(2) The silicon film on the surface of the SOI substrate is thermally oxidized to form an oxide film on the surface of the silicon film.

(3) A resist is applied to the oxide film, and the resist is exposed to an electron beam to form a triangular lattice array pattern. The pattern contains a line defect and a plurality of point defects.

(4) The resist is developed, and the oxide film is dry-etched using the developed resist pattern as a mask.

(5) Then, the resist is removed, and silicon film is dry-etched using the dry-etched oxide film as a mask. Then, the oxide film is removed by wet etching. In this way, a two-dimensional photonic crystal slab having a triangular lattice array of cylindrical air holes formed in the silicon is obtained.

(6) In addition, the base oxide film layer is removed by wet etching. As a result, there is provided a two-dimensional photonic crystal slab of silicon disposed between upper and lower air layers.

Embodiment 1

Figure 1:
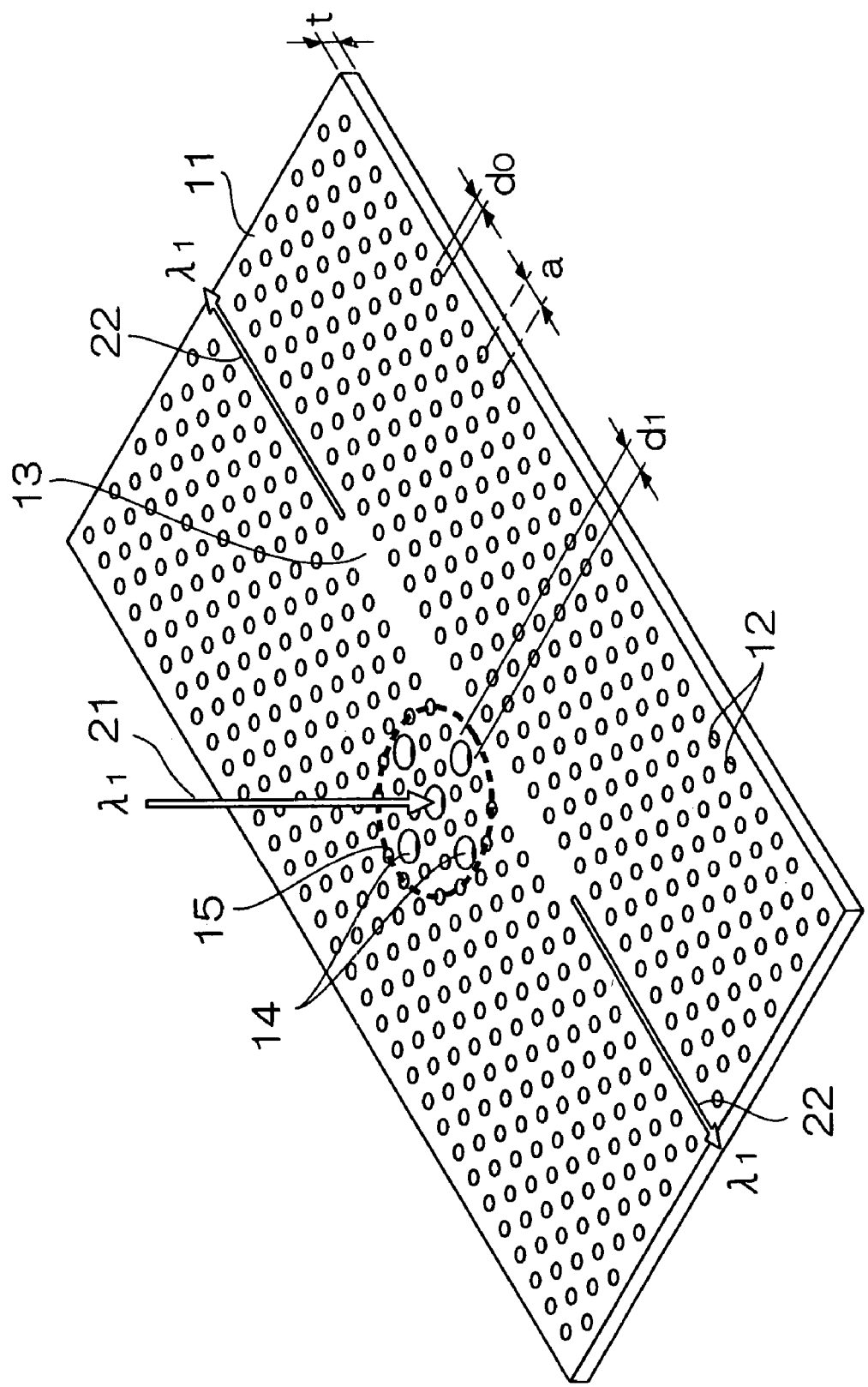
FIG. 1 is a perspective view of an embodiment of the present invention (an optical connector composed of a two-dimensional photonic crystal slab in which a line defect optical waveguide and five point defects are formed)
Figure 2:
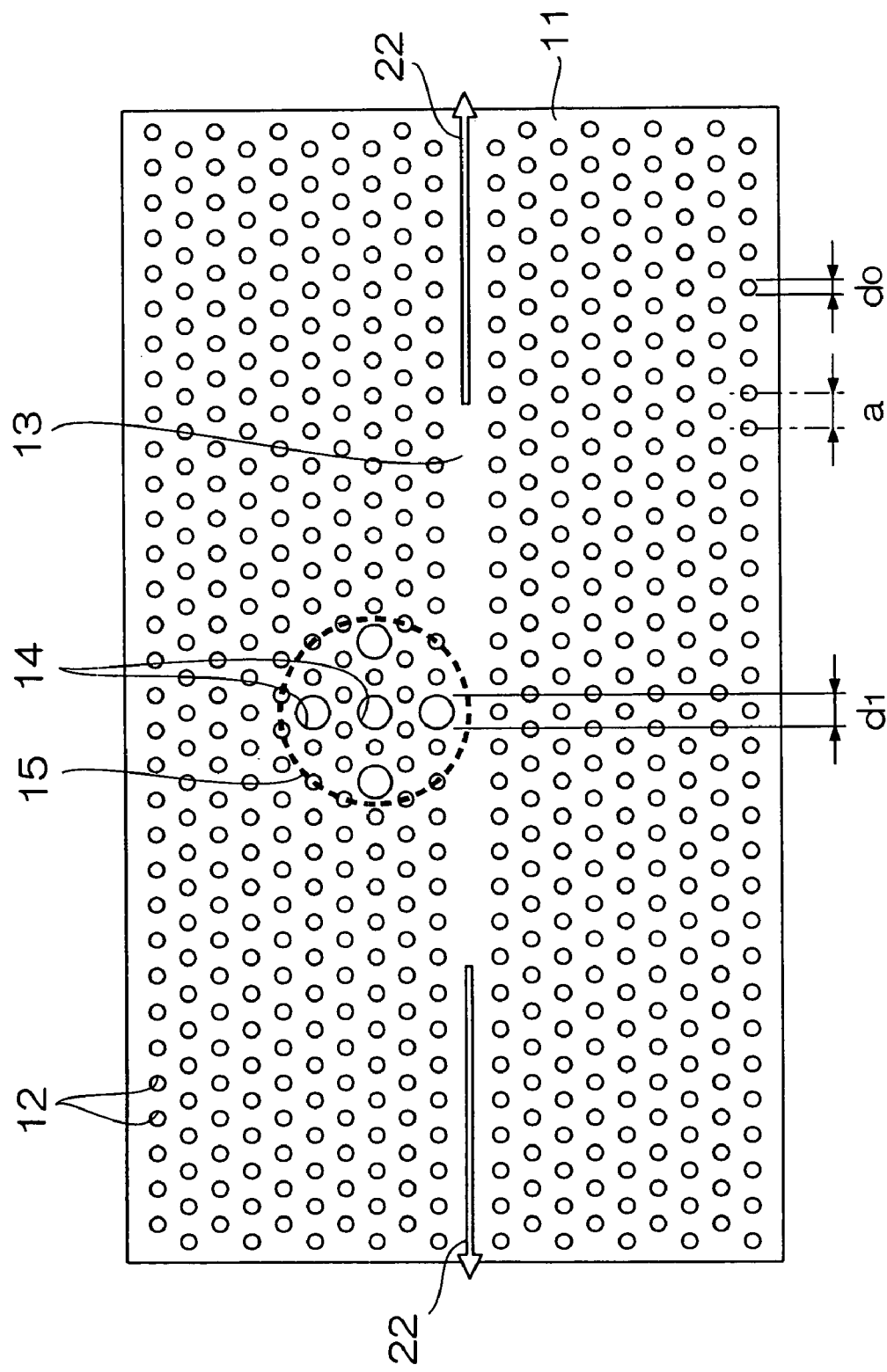
FIG. 2 is a plan view of the optical connector shown in FIG. 1.

FIGS. 1 and 2 show a two-dimensional photonic crystal slab that has a line defect optical waveguide and a plurality of point defects (defect holes) in the vicinity thereof. The two-dimensional photonic crystal slab is a silicon slab 11 having a triangular lattice array of air holes (cylindrical holes) 12 formed therein. The period a of the air holes 12, the diameter $d_0$ of each air hole 12, and the thickness t of the slab 11 are as follows.

$a=0.42$ μm, $d_0=0.244$ m, and $t=0.256$ μm

The line defect optical waveguide 13 is formed by eliminating a row of air holes 12, and five point defects 14 close to each other, which disturb the periodic structure of the photonic crystal, are disposed in the vicinity of the line defect optical waveguide 13. The five point defects 14 are arranged in the form of a cross as shown in FIGS. 1 and 2 and formed by changing the diameter of air holes 12 in the first, third and fifth rows from the line defect optical waveguide 13. The distance between adjacent two of the three point defects 14 in the third row is two-period length ($2a=0.84$ μm), and the five point defects 14 have a diameter $d_1$ of 0.47 μm.

Energy levels of the photonic band gap and defects in the photonic band gap were examined by three-dimensional simulation according to the finite difference time domain (FDTD) method. As a result, it was proven that a plurality of peaks occur in the photonic band. Among others, a wavelength of $\lambda_1=1.543$ μm was selected as an incident light wavelength. A Gaussian beam having a wavelength of $\lambda_1=1.543$ μm was input to a region 15 of the point defects 14 from a direction perpendicular to the in-plane direction of the two-dimensional photonic crystal slab, and the optical coupling efficiency of the incident light to the line defect optical waveguide 13 was assessed. In FIGS. 1 and 2, the arrow 21 indicates the incident light, and the arrow 22 indicates output light. The size of the region 15 is larger than the incident light wavelength $\lambda_1=1.543$ μm.

Figure 3:
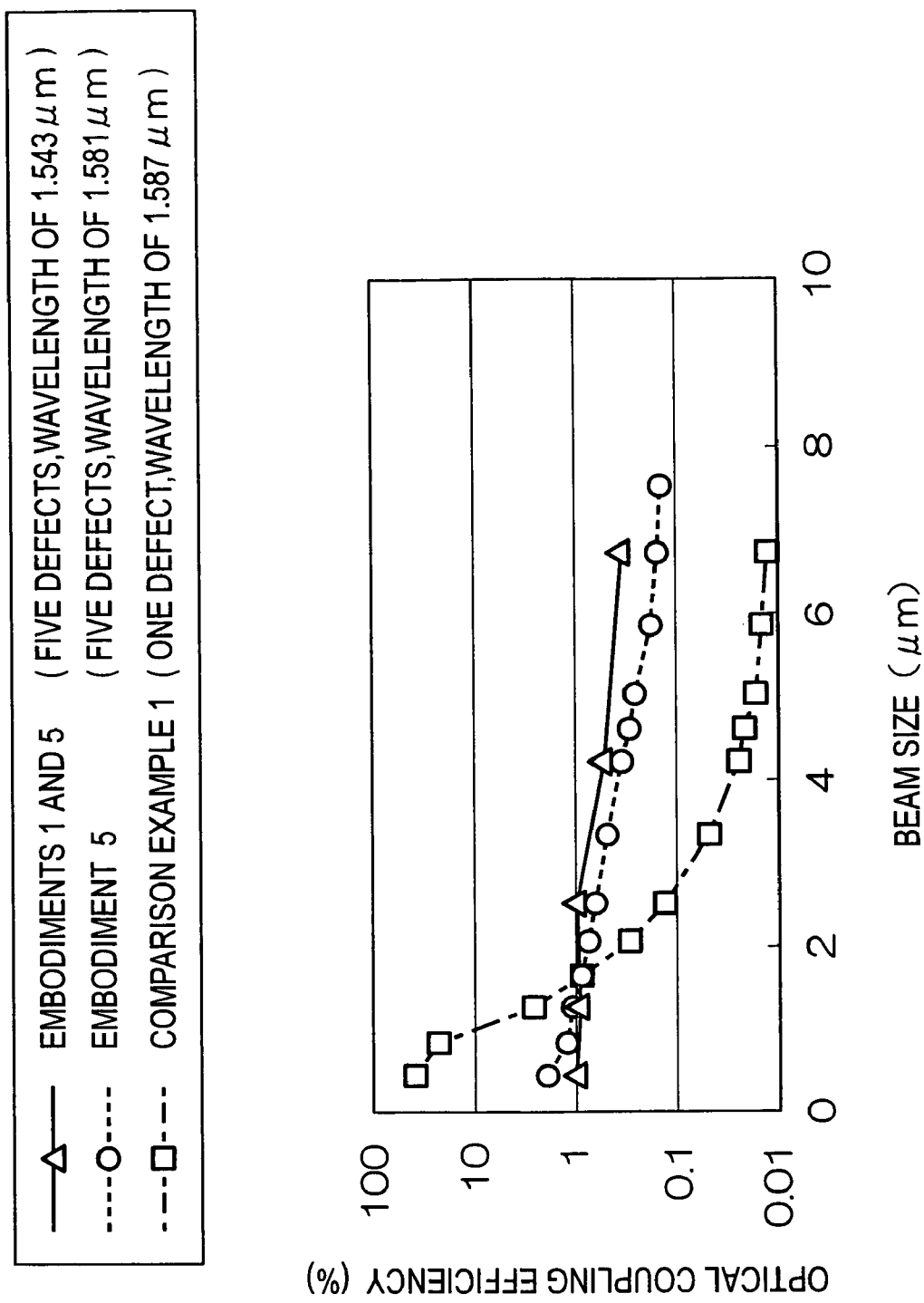
FIG. 3 is a graph showing relationships between the incident beam size and the optical coupling efficiency to the line defect waveguide.

The optical coupling efficiency is the ratio of the total intensity of the output light 22 output from the both end faces of the line defect optical waveguide 13 to the intensity of the incident light 21. The measurement was performed by three-dimensional simulation according to the FDTD method. FIG. 3 shows a result of investigation of the relationship between the beam size (beam diameter) of the incident light 21 and the optical coupling efficiency. In the range of beam sizes used in the measurement, the optical coupling efficiency gently decreased as the beam size increased. The optical fiber was a single-mode fiber, and the core diameter thereof was approximately 6 to 10 μm, and the optical coupling efficiency was about 0.4% for a beam size of 6.7 μm, which is equivalent to the core diameter of the optical fiber.

Embodiment 2

Figure 4:
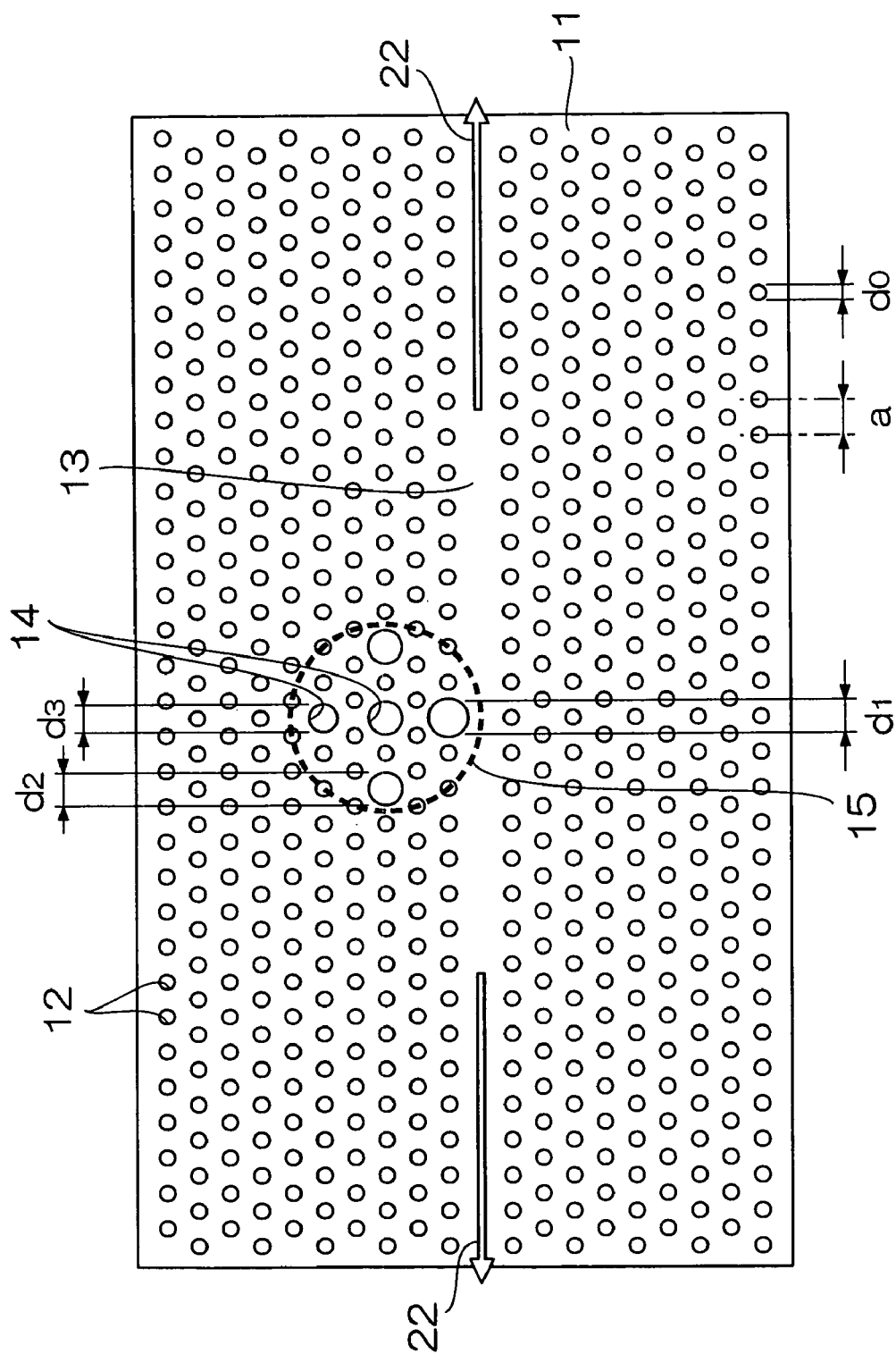
FIG. 4 is a plan view of an embodiment of the present invention (an optical connector composed of a two-dimensional photonic crystal slab in which a line defect optical waveguide and five point defects having different sizes are formed)

Unlike the embodiment 1 in which the five point defects 14 have the same shape, the five point defects 14 have different shapes in this embodiment 2. Except that the five point defects 14 have different shapes, a two-dimensional photonic crystal slab was fabricated in the same manner as in the embodiment 1. FIG. 4 shows a structure of the two-dimensional photonic crystal slab.

The point defect 14 located in the first row from the line defect optical waveguide 13 has a diameter $d_1$ of 0.49 μm, the three point defects 14 located in the third row have a diameter $d_2$ of 0.47 μm, and the point defect 14 located in the fifth row has a diameter $d_3$ of 0.46 μm.

As in the embodiment 1, energy levels of the photonic band gap and defects in the photonic band gap were examined by three-dimensional simulation according to the FDTD method. As a result, it was proven that a plurality of peaks occur in the photonic band. Among others, a wavelength of $\lambda_1=1.520$ μm was selected as an incident light wavelength, and the optical coupling efficiency was assessed as in the embodiment 1. The optical coupling efficiency for a beam size of 6.7 μm was about 0.4%. It was proven that, compared with the embodiment 1 in which all the point defects 14 have the same shape, the coupling wavelength $\lambda_1$ can be changed.

Embodiment 3

Figure 5:
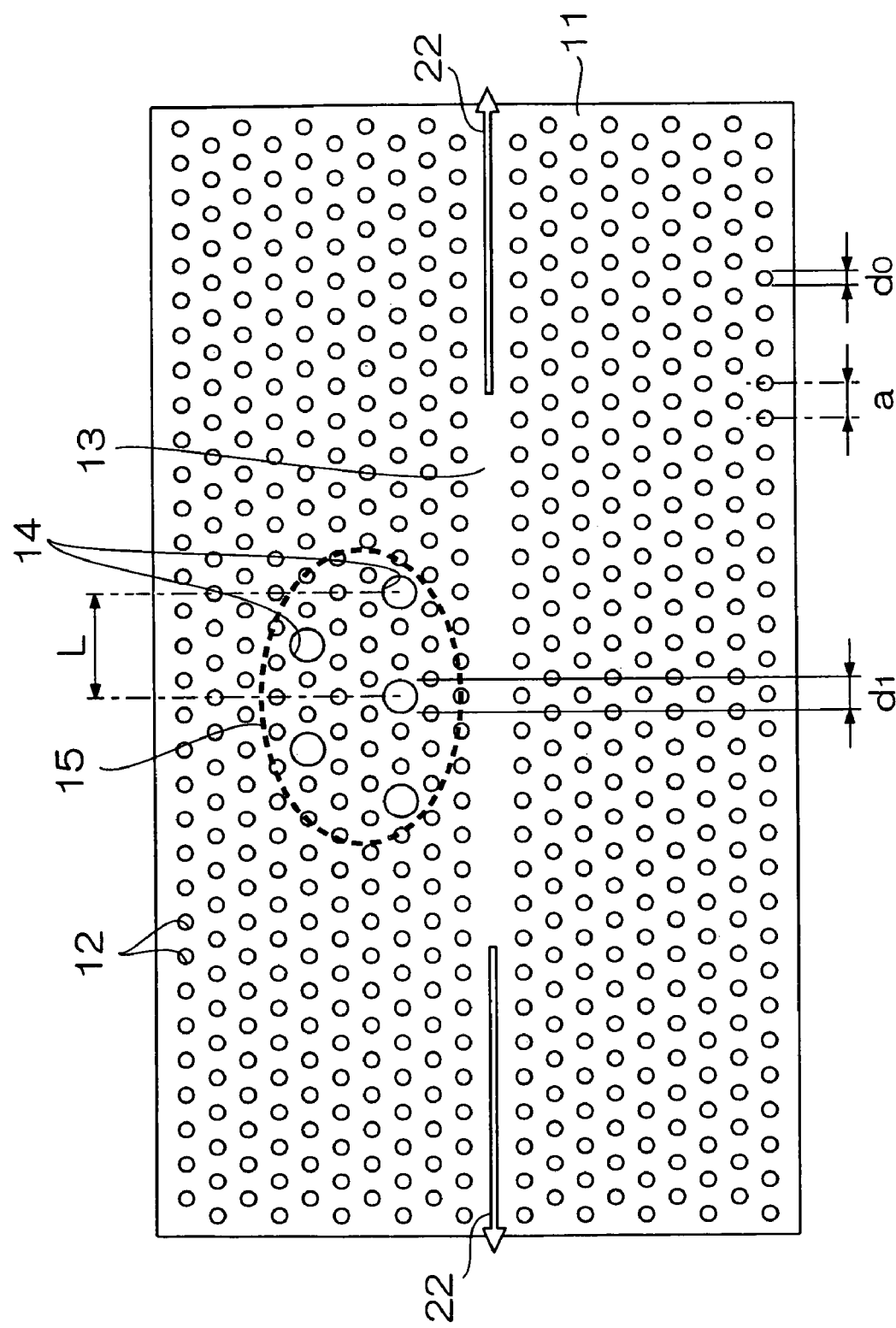
FIG. 5 is a plan view of an embodiment of the present invention (an optical connector composed of a two-dimensional photonic crystal slab in which a line defect optical waveguide and five point defects arranged periodically along the line defect optical waveguide are formed)

In this embodiment 3, the five point defects 14 are arranged in a configuration shown in FIG. 5, unlike the embodiment 1 in which the point defects are arranged in the form of a cross. Except for the arrangement, a two-dimensional photonic crystal slab was fabricated in the same manner as in the embodiment 1.

All the point defects 14 have a diameter $d_1$ of 0.47 μm, and the distance between the point defects 14 is L. In this embodiment, the defect levels formed in the photonic band gap were examined in the same manner as in the embodiment 1 by changing the distance L from two times ($2a=0.84$ μm) to seven times ($7a=2.94$ μm) the refractive index period a of the photonic crystal.

As a result, it was proven that in the case where the distance L is larger than the four-period length ($4a=1.68$ μm), the energy levels of the defects can be explained by simple superposition of the five point defects 14 are formed individually. On the other hand, it was proven that in the case where the distance L is equal to or less than the four-period length, the defect energy levels are shifted from the levels that would be achieved if the five point defects 14 are formed individually, and the point defects 14 interact with each other. In addition, the optical coupling efficiency was also examined by inputting a Gaussian beam having a beam size of 6.7 μm. In the case where the distance L was larger than the four-period length, the optical coupling efficiency was 0.02% (wavelength $\lambda_1$=1.587 μm), which is equivalent to the value in the case where one point defect 14 is formed in an isolated manner. And in the case where the distance L was equal to or less than the four-period length, the optical coupling efficiency increased as the distance L decreased, and when the distance L was the two-period length, the optical coupling efficiency was about 0.3% (wavelength $\lambda_1$=1.558 μm).

Embodiment 4

Figure 6:
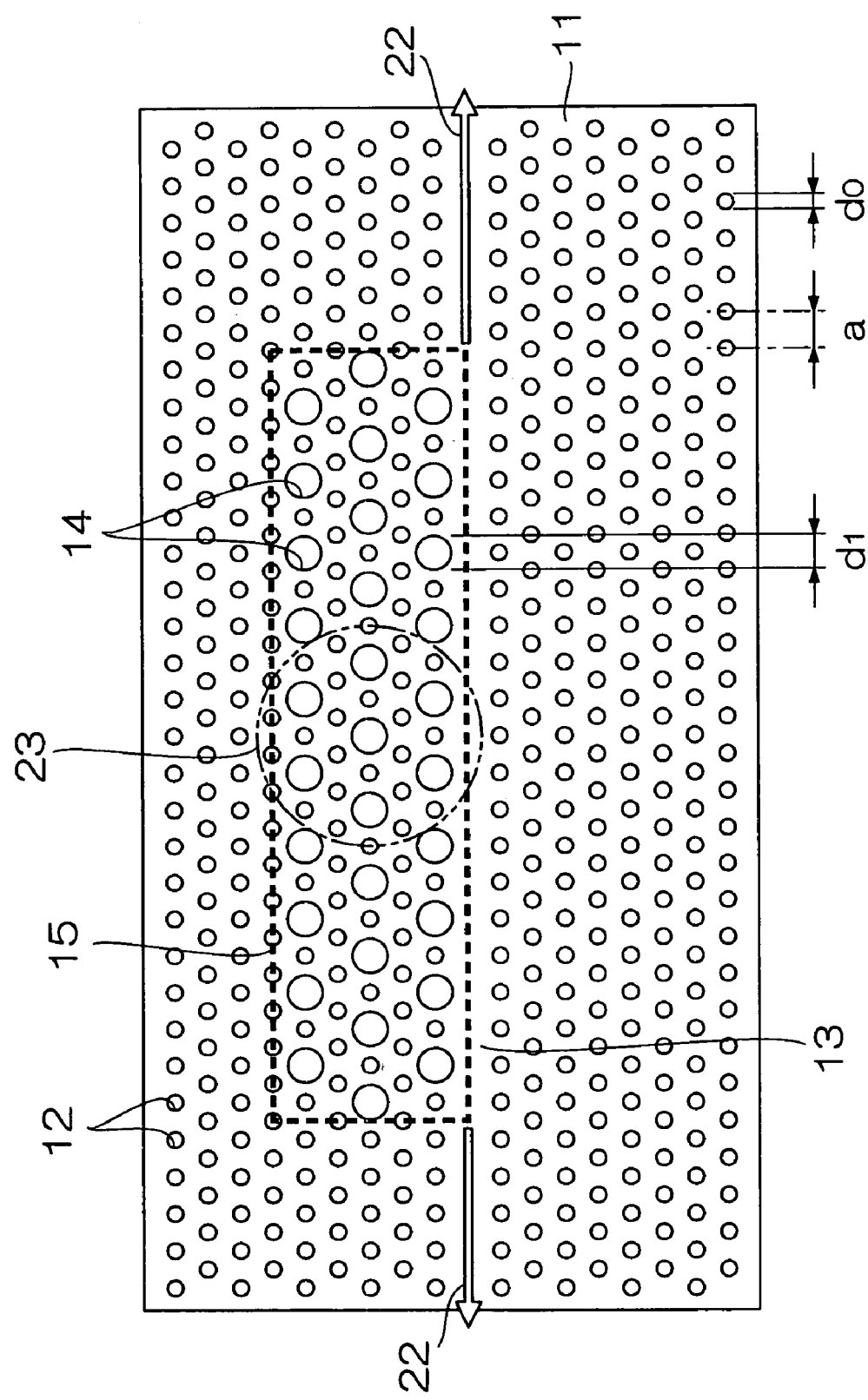
FIG. 6 is a plan view of an embodiment of the present invention (an optical connector composed of a two-dimensional photonic crystal slab in which one line defect optical waveguide is adjacent to a region in which point defects are periodically arranged)

As shown in FIG. 6, a line defect optical waveguide 13 and 31 point defects 14 were formed in a two-dimensional photonic crystal slab similar to that in the embodiment 1. The 31 point defects 14 were periodically arranged in a triangular lattice configuration along the line defect optical waveguide 13. The period length of the point defects 14 is 0.84 μm (=2a), and all the point defects 14 have a diameter $d_1$ of 0.47 μm. A Gaussian beam was input to a region 15 of the point defects 14 from a direction perpendicular to the slab surface. In the case where the Gaussian beam had a wavelength $\lambda_1$=1.501 μm and a beam size of 2.5 μm, the optical coupling efficiency was 0.7%. In FIG. 6, reference numeral 23 denotes the incident beam. The beam size of 2.5 μm corresponds to the size of a beam output from a hemispherical-ended fiber, for example.

Figure 7:
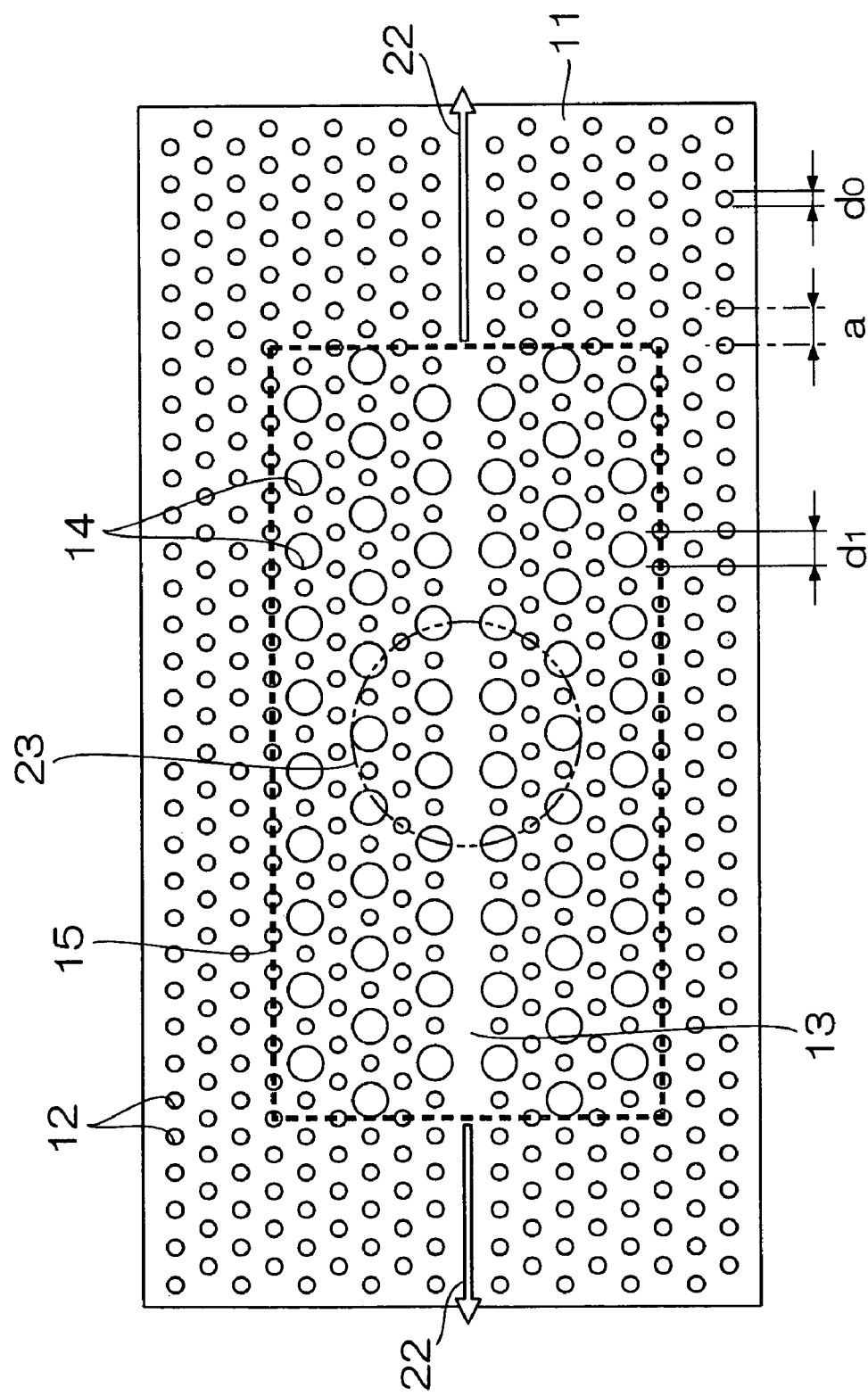
FIG. 7 is a plan view of an embodiment of the present invention (an optical connector composed of a two-dimensional photonic crystal slab in which one line defect optical waveguide passes through a region in which point defects are periodically arranged)
Figure 8:
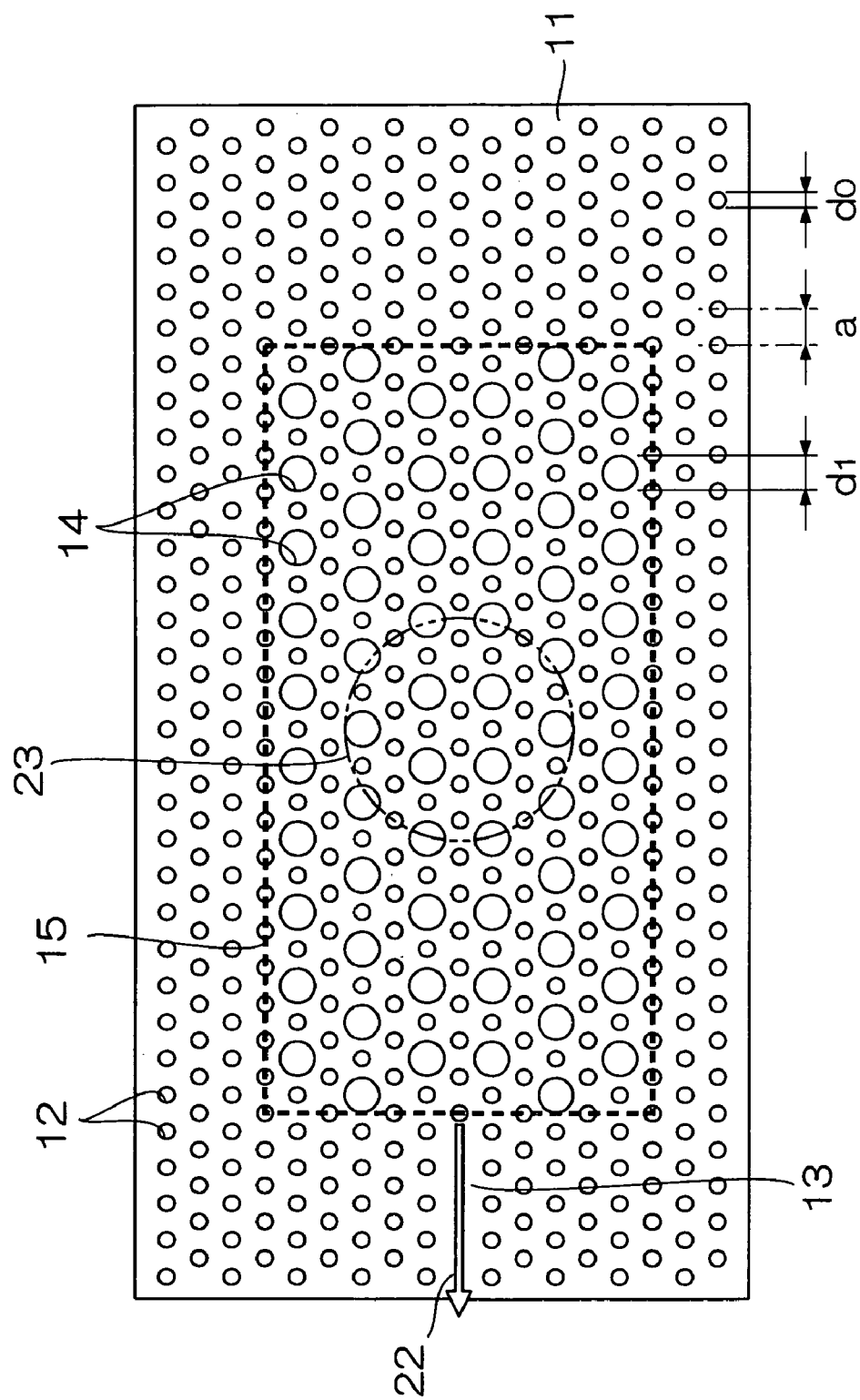
FIG. 8 is a plan view of an embodiment of the present invention (an optical connector composed of a two-dimensional photonic crystal slab in which one line defect optical waveguide is coupled to a region in which point defects are periodically arranged)
Figure 9:
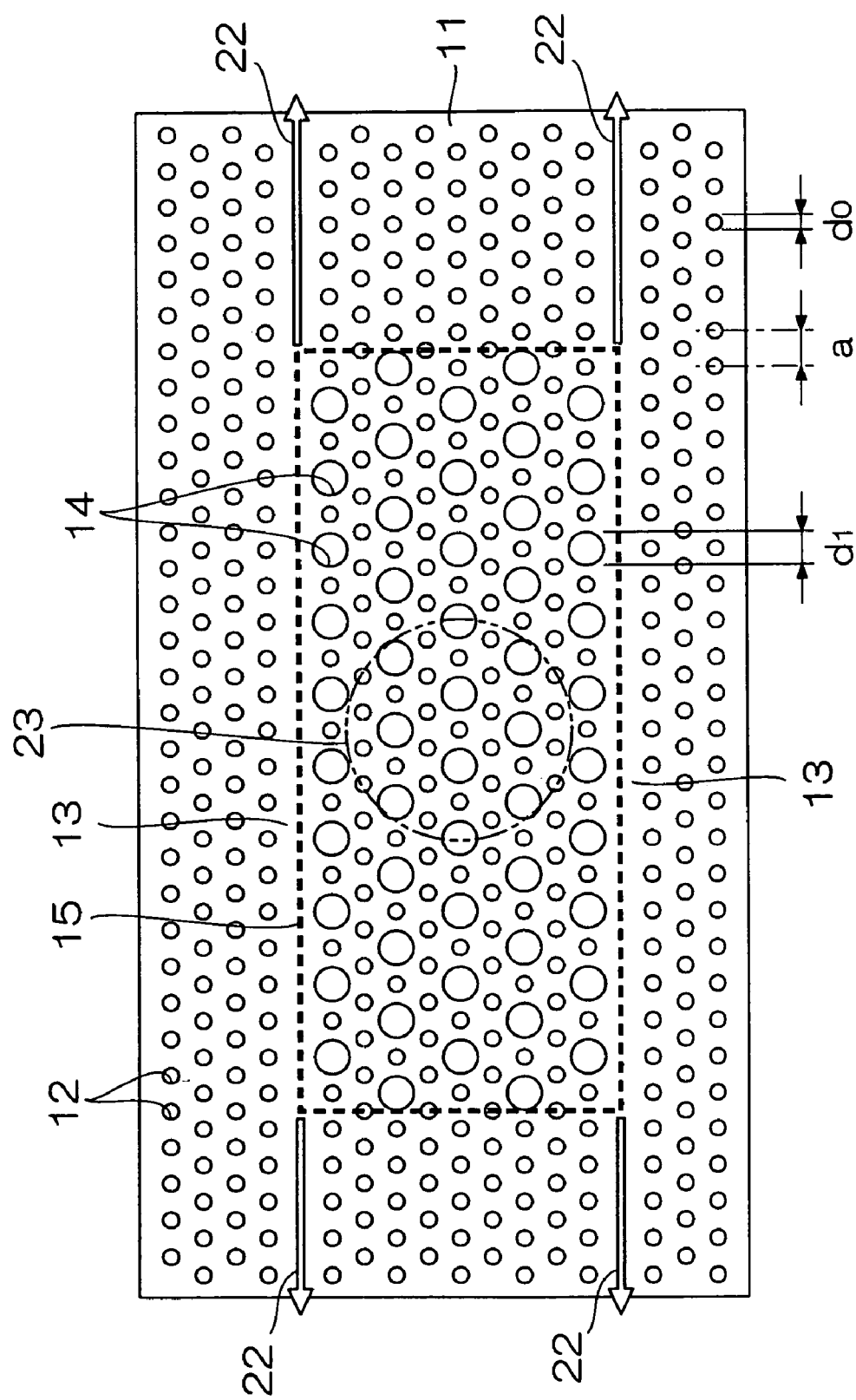
FIG. 9 is a plan view of an embodiment of the present invention (an optical connector composed of a two-dimensional photonic crystal slab in which two line defect optical waveguides are adjacent to a region in which point defects are periodically arranged along the both sides thereof)

FIGS. 7 to 9 show examples in which the positional relationship between the region 15 where the point defects 14 are periodically arranged and the line defect optical waveguide 13 is different from that in FIG. 6. Specifically, unlike FIG. 6 in which the region 15 in which the point defects 14 are periodically arranged is adjacent to one line defect optical waveguide 13, FIG. 7 shows a structure in which one line defect optical waveguide 13 passes through the region 15. In addition, FIG. 8 shows a structure in which one line defect optical waveguide 13 is coupled to the region 15, that is, an inner end of one line defect optical waveguide 13 is coupled to the region 15, and FIG. 9 shows a structure in which the region 15 is adjacent to two line defect optical waveguide 13 along the opposite sides thereof.

With regard to the structures shown in FIGS. 7 to 9, as in the case shown in FIG. 6, a Gaussian beam having a wavelength $\lambda_1$=1.501 μm and a beam size of 2.5 μm was input to the region 15 substantially at the center thereof, and the optical coupling efficiency was examined. The optical coupling efficiency was defined as a ratio of the total intensity of the light output from all the line defect optical waveguides 13 (for example, in FIG. 9, the total intensity of the light output from the four ends of the line defect optical waveguides 13) to the incident light intensity. The optical coupling efficiency was 0.2% for the structure shown in FIG. 7, 0.1% for the structure shown in FIG. 8, and 0.4% for the structure shown in FIG. 9.

Figure 10:
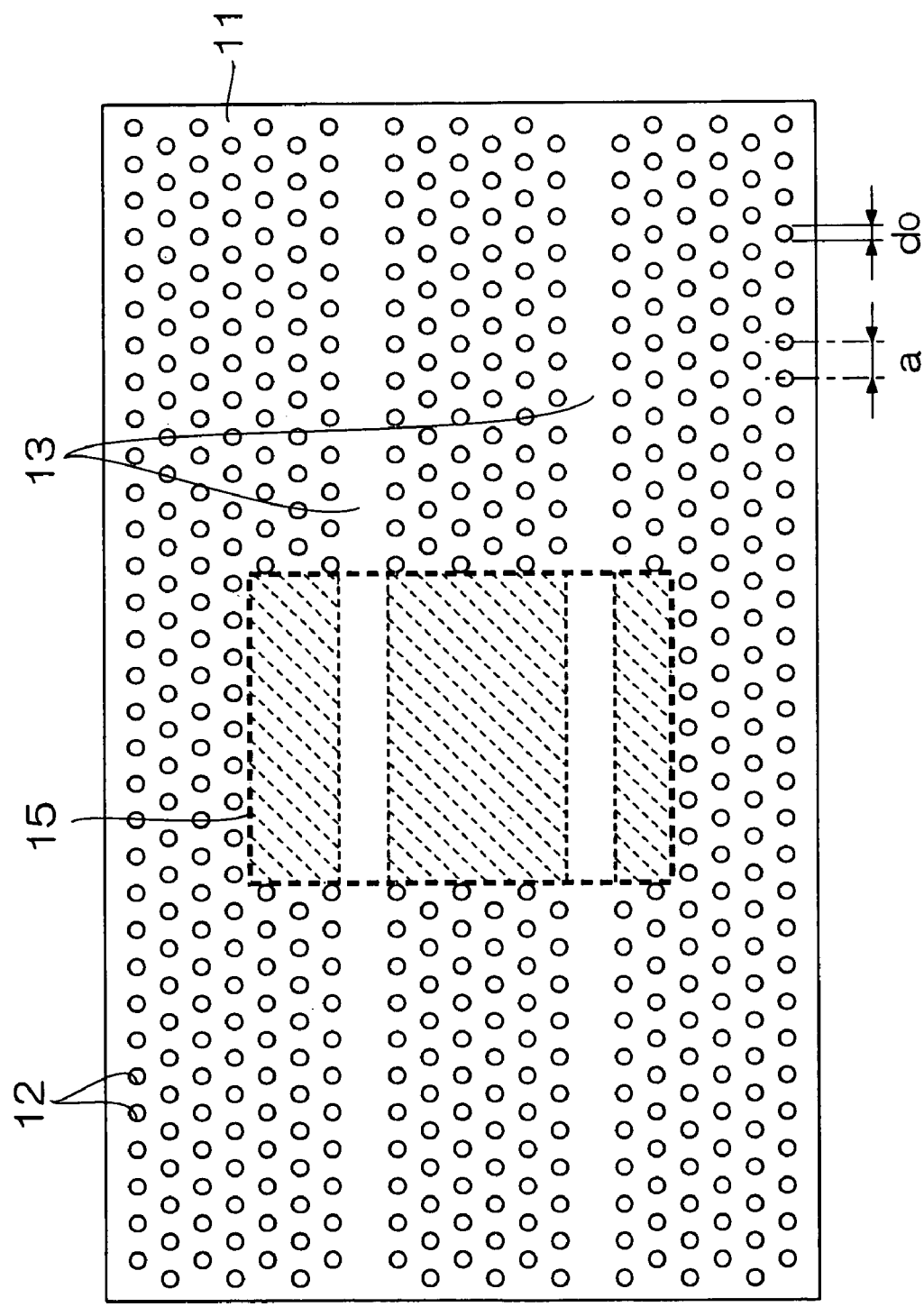
FIG. 10 is a plan view of an embodiment of the present invention (an optical connector composed of a two-dimensional photonic crystal slab in which two line defect optical waveguides pass through a region in which point defects are periodically arranged)
Figure 11:
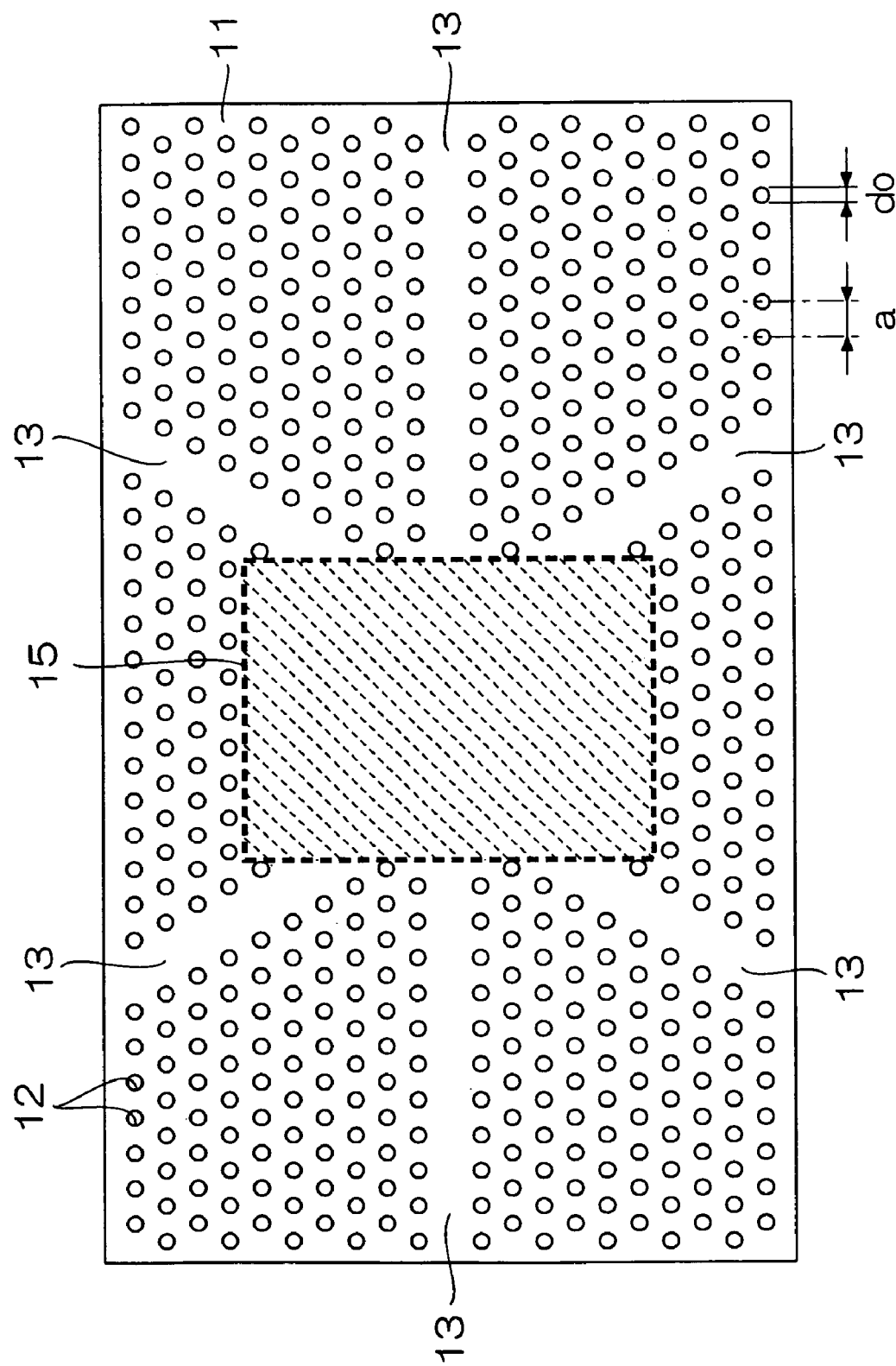
FIG. 11 is a plan view of an embodiment of the present invention (an optical connector composed of a two-dimensional photonic crystal slab in which six line defect optical waveguides are coupled to a region in which point defects are periodically arranged)
Figure 12:
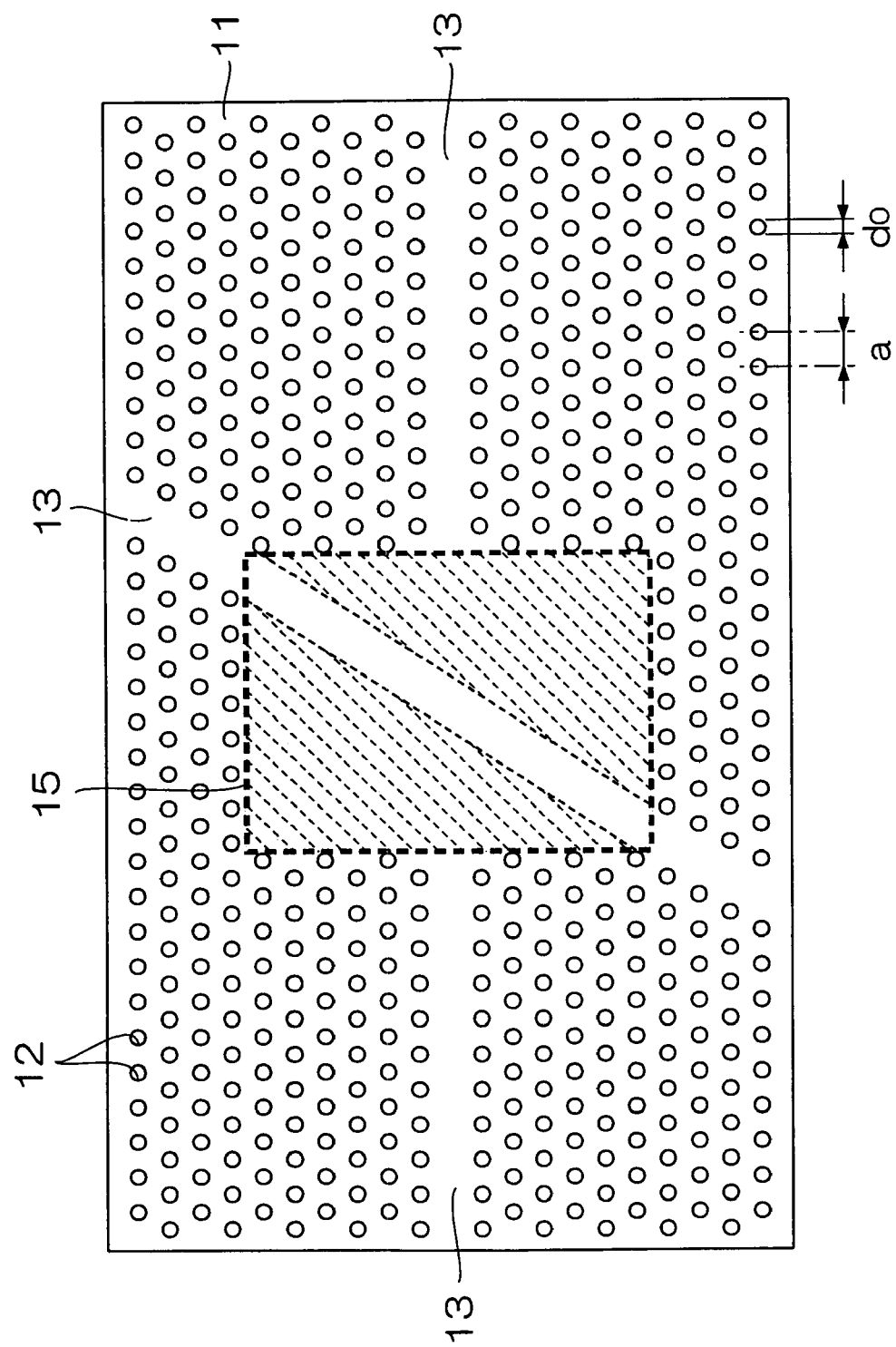
FIG. 12 is a plan view of an embodiment of the present invention (an optical connector composed of a two-dimensional photonic crystal slab in which one line defect optical waveguide passes through a region in which point defects are periodically arranged, and two line defects optical waveguides are coupled to the same region)

The positional relationship between the region 15 where the point defects 14 are periodically arranged and the line defect optical waveguide 13 is not limited to those shown in FIGS. 6 to 9, and any positional relationships can be adopted as required. FIGS. 10 to 12 show such embodiments. FIG. 10 shows a structure in which two line defect optical waveguides 13 pass through the region 15 in which an array of point defects 14 is formed, and FIG. 11 shows a structure in which six line defect optical waveguides 13 are coupled to the region 15. FIG. 12 shows a structure in which one line defect optical waveguide 13 passes through the region 15, and additional two line defect optical waveguides 13 are coupled to the region 15. In this way, a plurality of line defect optical waveguides 13 may pass through, be coupled to and/or be adjacent to the region 15. In FIGS. 10 to 12, the point defects 14 periodically arranged in the region 15 are not illustrated specifically.

Embodiment 5

Figure 13:
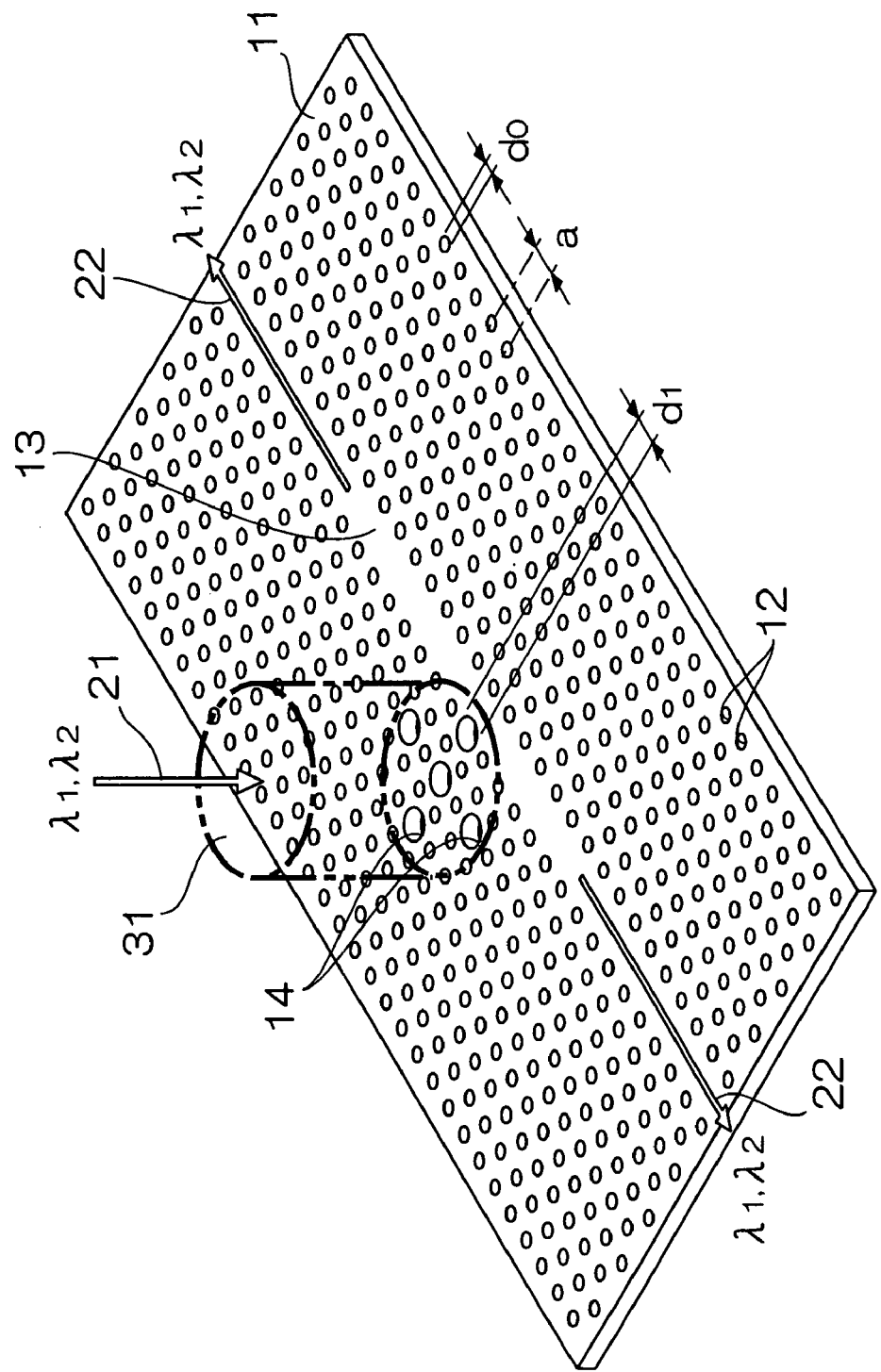
FIG. 13 is a perspective view of the two-dimensional photonic crystal slab shown in FIG. 1 to which light is input from an optical fiber.
Figure 14:
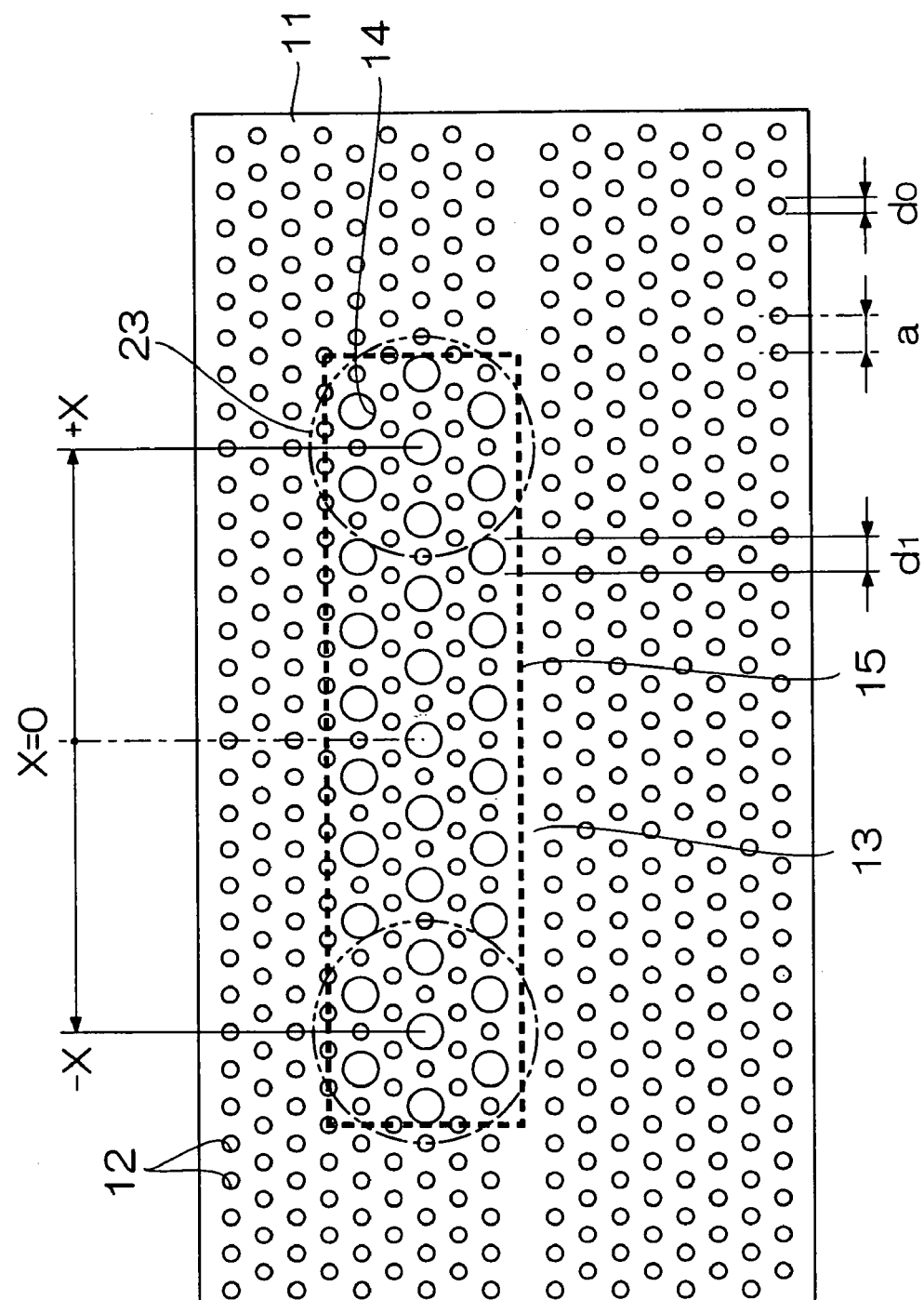
FIG. 14 is a plan view showing the position of the beam incident on the two-dimensional photonic crystal slab shown in FIG. 6.

The examination of the defect energy level of the two-dimensional photonic crystal slab in the embodiment 1 proved that a plurality of peaks occur. Thus, in the embodiment 5, among others, the wavelengths of $\lambda_1$=1.543 μm (the same wavelength as in the embodiment 1) and $\lambda_2$=1.581 μm were selected as the incident light wavelengths, and the optical coupling efficiency to the line defect optical waveguide 13 was examined by inputting a Gaussian beam having wavelengths $\lambda_1$ and $\lambda_2$ to the region 15 in which five point defects 14 were formed. FIG. 13 shows incident light 21 having a plurality of wavelengths $\lambda_1$ and $\lambda_2$ input through one optical fiber 31. The two-dimensional photonic crystal slab has the same structure as in FIG. 1.

The examination result of the relationship between the beam size and the optical coupling efficiency is shown in FIG. 3. As can be seen from FIG. 3, as in the case of the wavelength $\lambda_1$=1.543 μm described with regard to the embodiment 1, in the case of the wavelength $\lambda_2$=1.581 μm, the optical coupling efficiency gently decreased as the beam size increased within the measurement range of beam size. However, it was proven that, regardless of the beam size, the light of both the wavelengths is coupled to the line defect optical waveguide 13. In the case where the beam size was 6.7 μm, the optical coupling efficiency of the light having the wavelength of $\lambda_1$=1.543 μm was about 0.4%, and the optical coupling efficiency of the light having the wavelength of $\lambda_2$=1.581 μm was about 0.15%.

Embodiment 6

Using the two-dimensional photonic crystal slab having the structure in the embodiment 4 shown in FIG. 6, the optical coupling efficiency of incident light to the line defect optical waveguide 13 was examined by changing the position of the incident light along an X direction, where the X direction is a direction in which the point defects 14 are arranged along the line defect optical waveguide 13. The incident light was a Gaussian beam having a wavelength of $\lambda_1$=1.501 μm and a beam size of 2.5 μm.

Figure 15:
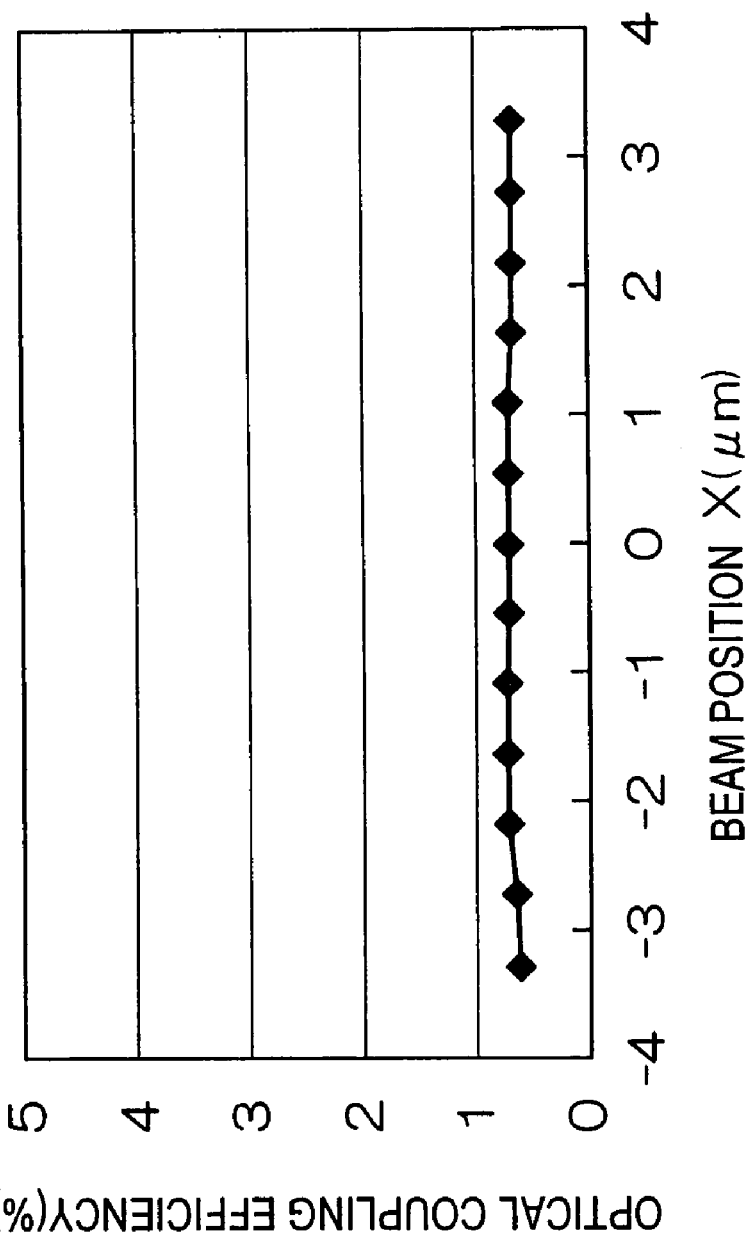
FIG. 15 is a graph showing a relationship between the incident beam position and the optical coupling efficiency to the line defect optical waveguide for the structure shown in FIG. 14.

The examination result is shown in FIG. 15. In the region 15 in which the point defects 14 are periodically arranged, that is, within a range of X=−3.36 μm to X=+3.36 μm, the optical coupling efficiency was substantially constant, 0.7%.

Embodiment 7

Figure 16:
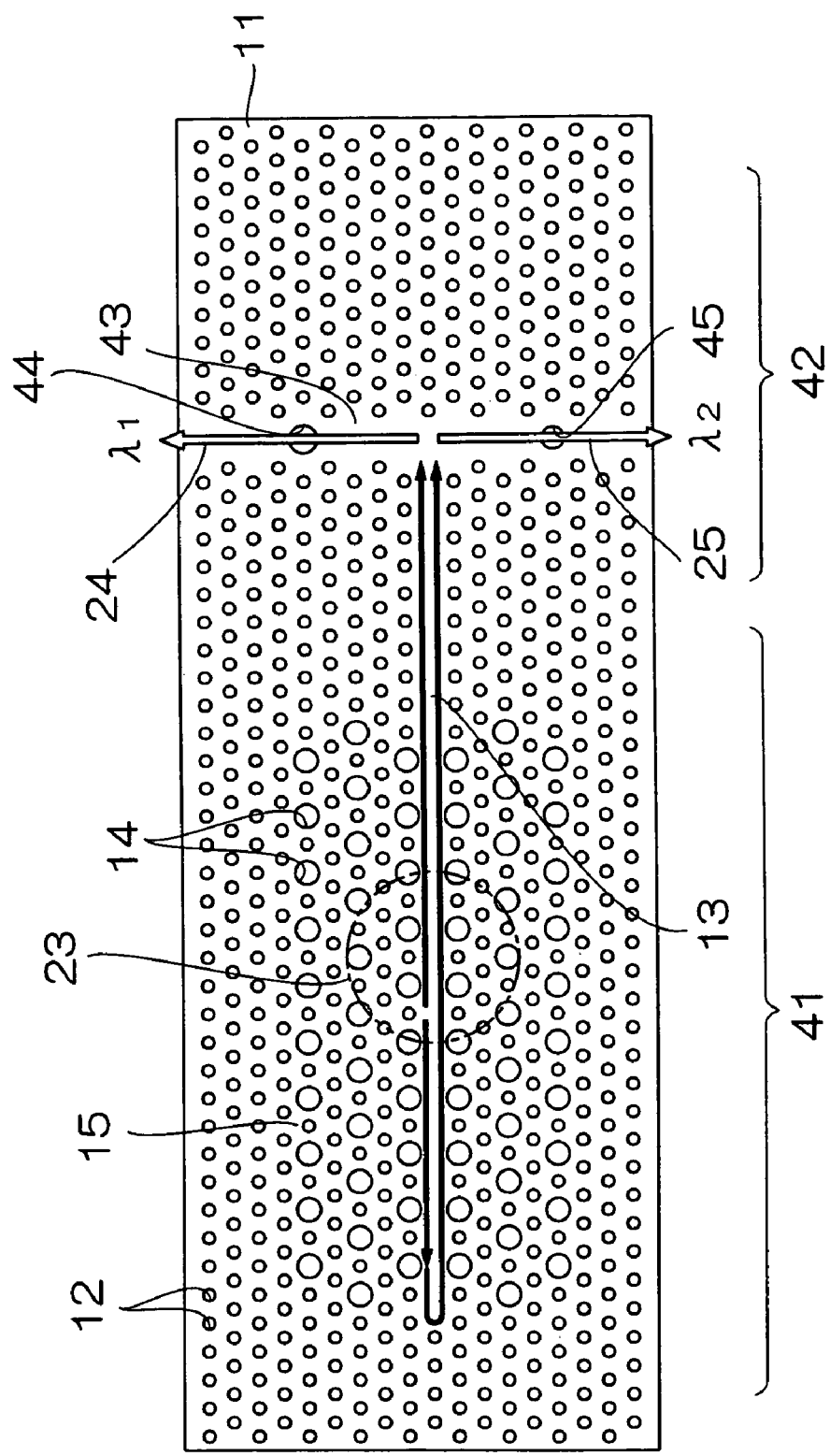
FIG. 16 is a plan view of an embodiment of the present invention (a device composed of a photonic crystal filter and an optical connector integrally formed)
Figure 17:
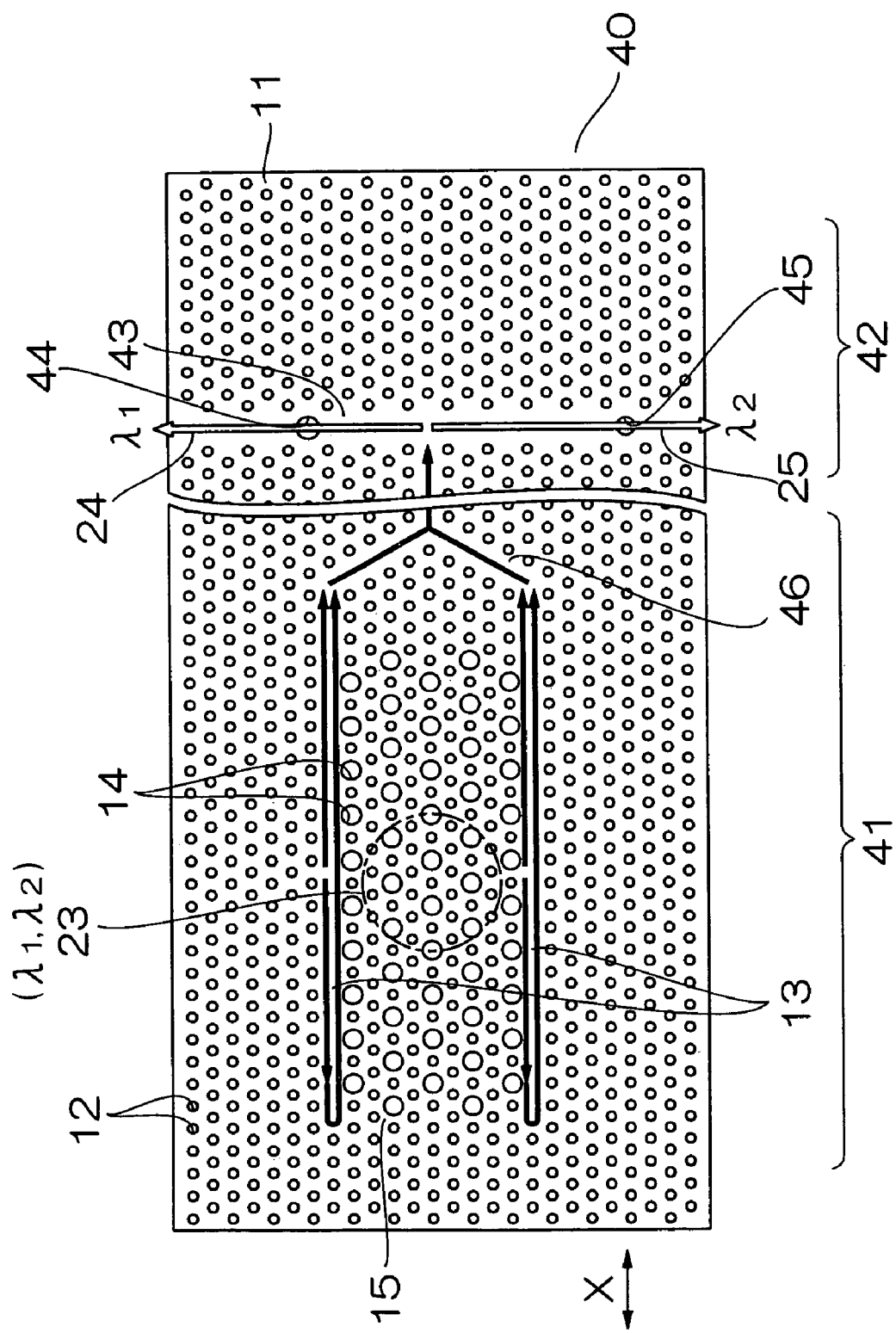
FIG. 17 is a plan view of an embodiment of the present invention (a device composed of a photonic crystal filter and an optical connector integrally formed)

FIGS. 16 and 17 show embodiments of a device that is composed of a photonic crystal filter (optical element) constituted by a two-dimensional photonic crystal slab and an optical connector (optical coupling section) constituted by a two-dimensional photonic crystal slab that are integrally formed. In FIGS. 16 and 17, reference numeral 41 denotes a connector section, and reference numeral 42 denotes a filter section.

In the filter section 42, point defect holes 44 and 45, which serve as a resonant structure, are formed in a line defect optical waveguide 43. The connector section 41 shown in FIG. 16 has the same structure as shown in FIG. 7, in which one line defect optical waveguide 13 passes through the region 15 in which point defects 14 are periodically arranged, and the line defect optical waveguide 13 is perpendicularly coupled to the line defect optical waveguide 43 in the filter section 42.

On the other hand, in FIG. 17, the connector section 41 has the same structure as shown in FIG. 9, in which the region 15 in which point defects 14 are periodically arranged is sandwiched between two line defect optical waveguide 13. The two line defect optical waveguides 13 are integrated via a Y-shaped line defect optical waveguide 46 and then coupled to the line defect optical waveguide 43 in the filter section 42. The connector section 41 and the filter section 42 of the devices shown in FIGS. 16 and 17 can be fabricated by a simultaneous process, and therefore, the connector section 41 and the filter section 42 are automatically aligned with each other with a fine working precision. In the following, as an example, the device shown in FIG. 17 will be described.

A Gaussian beam composed of light having a wavelength of $\lambda_1$=1.501 μm and light having a wavelength of $\lambda_2$=1.566 μm was input through an optical fiber to the region 15 perpendicularly to the surface of the photonic crystal slab. The incident light was coupled to the line defect optical waveguides 13 via a plurality of point defects 14 periodically arranged in the region 15 and guided to the filter section 42. The two light of different wavelengths $\lambda_1$ and $\lambda_2$ were separated by the filter section 42, and the light of the wavelength $\lambda_1$=1.501 μm and the light of the wavelength $\lambda_2$=1.566 μm were output at different positions in the plane of the slab 11, as shown by output light 24 and 25. The connector section 41 has multiple point defects 14 periodically arranged, and the optical coupling efficiency does not vary significantly even if the position of the optical fiber (position of the incident bean 23) is shifted by several micrometers in the X direction, as described with regard to the embodiment 4. Thus, alignment of the connector 41 can be readily achieved.

Figure 18:
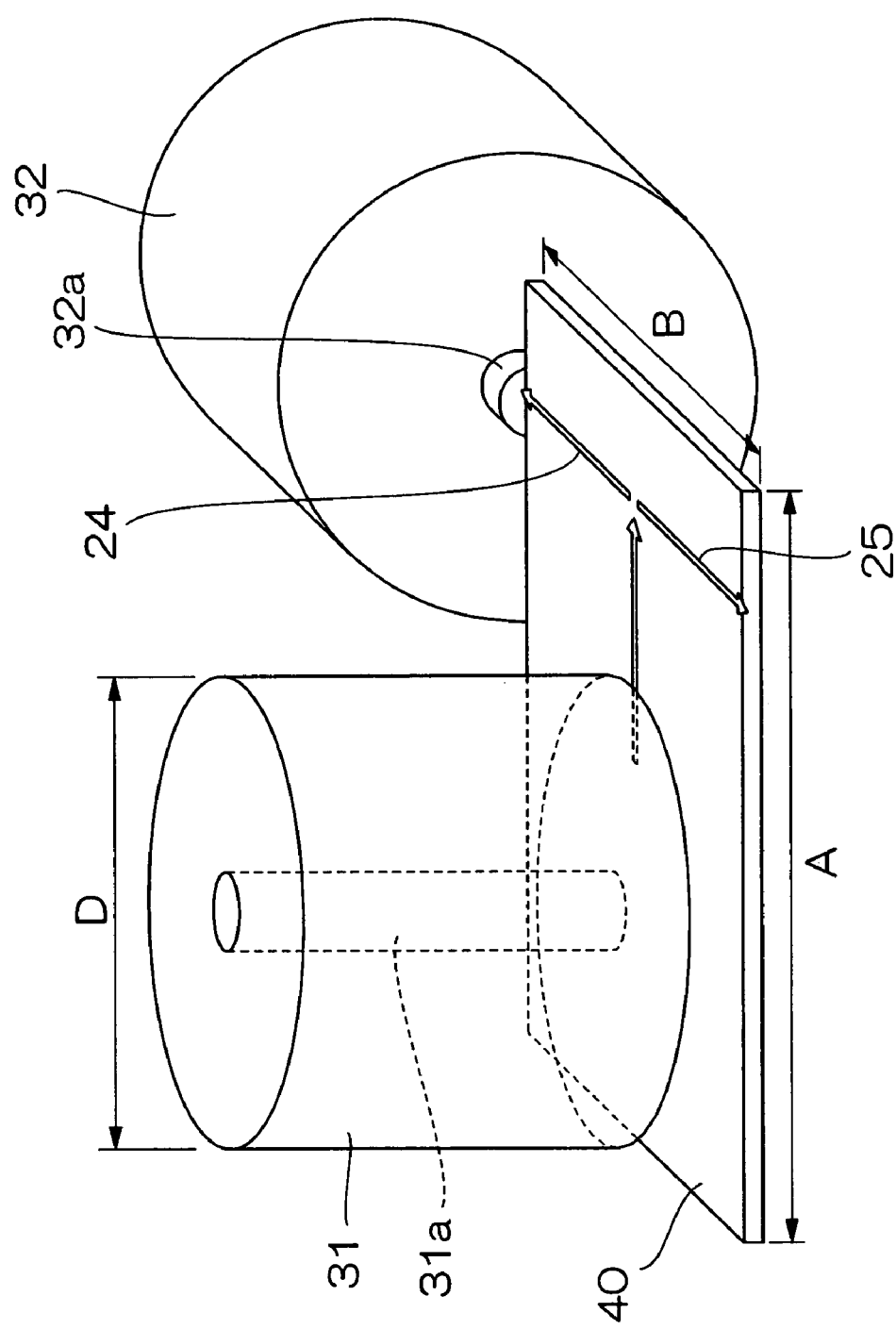
FIG. 18 is a schematic perspective view of an optical module having the device shown in FIG. 17 integrated with optical fibers.

FIG. 18 is a schematic diagram showing a device 40 composed of the connector section 41 and the filter section 42 shown in FIG. 17 to which optical fibers 31 and 32 are attached, which is an optical module comprising the device 40 constituted by a two-dimensional photonic crystal slab, the input optical fiber 31 fixed to the device 40 perpendicularly to the slab surface, and the output optical fiber 32 fixed to the device 40 in parallel with the slab plane. In FIG. 18, reference numerals 31a and 32a denote an optical fiber core. Illustration of the optical fiber for the output light 25 is omitted. The optical fibers 31 and 32 have a diameter D of 125 μm, for example. And for example, the slab-like (rectangular-plate-like) device 40 has a size of A=about 200 μm by B=about 150 μm.

COMPARISON EXAMPLE 1

Figure 19:
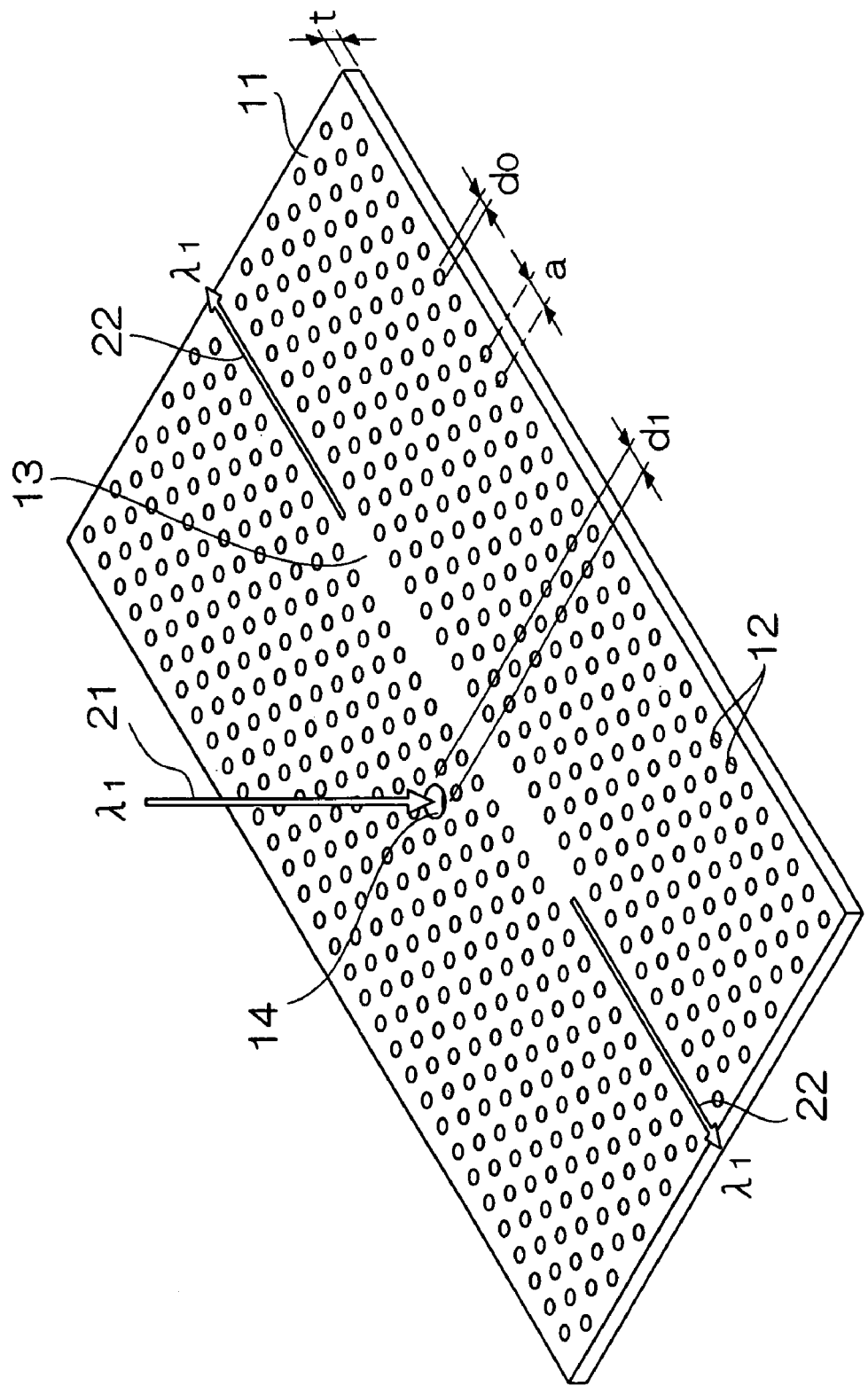
FIG. 19 is a perspective view of a two-dimensional photonic crystal slab (an example of the prior art) in which a line defect optical waveguide and one point defect are formed.
Figure 20:
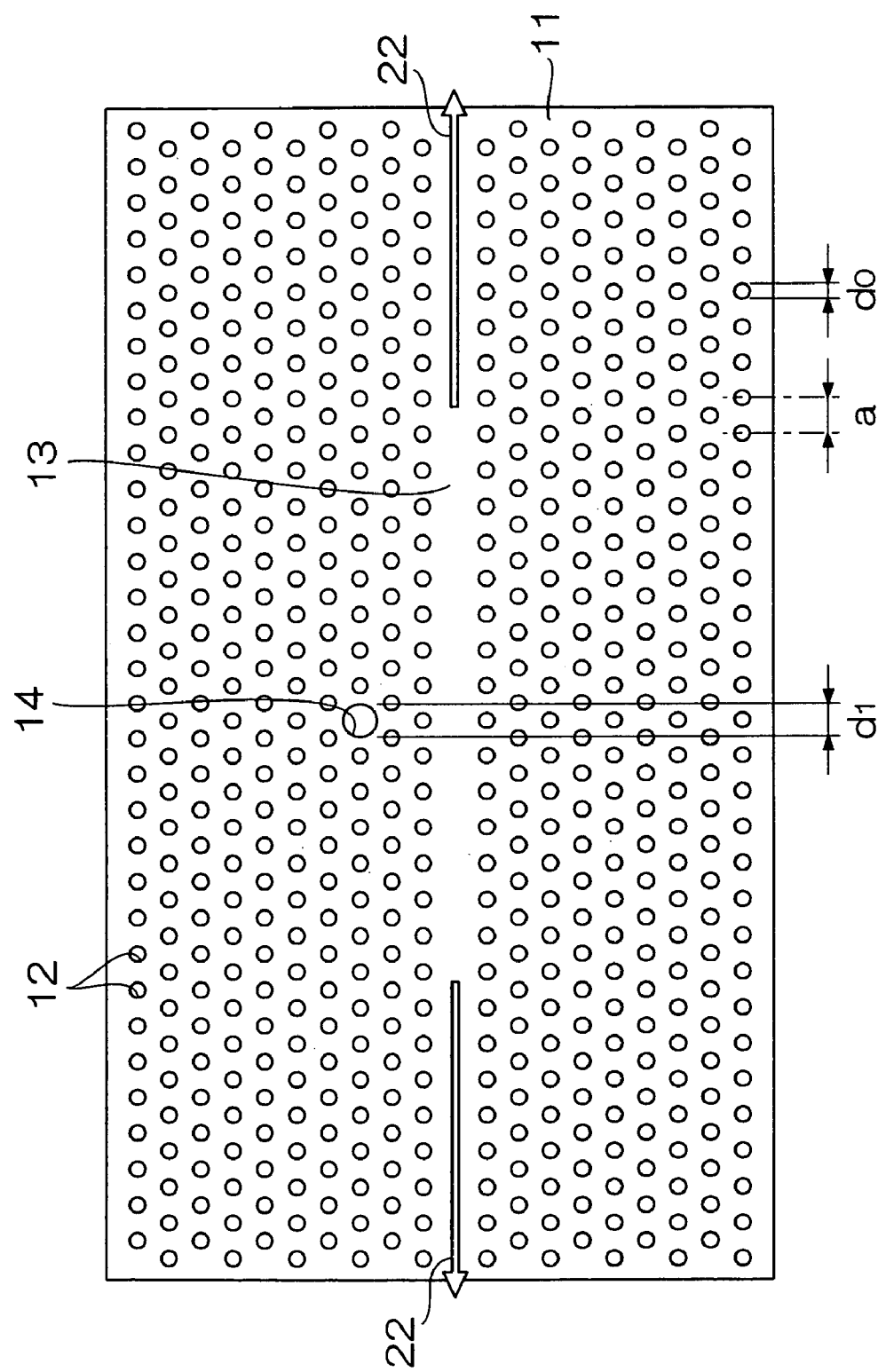
FIG. 20 is a plan view of the two-dimensional photonic crystal slab shown in FIG. 19.

A two-dimensional photonic crystal slab was fabricated in the same manner as in the embodiment 1 except that there is formed only one point defect. The structure is shown in FIGS. 19 and 20.

The diameter $d_1$ of the point defect 14 was 0.47 μm, and the point defect was placed in the third row from the line defect optical waveguide 13. The energy levels of the photonic band gap and the defect in the photonic band gap were examined by three-dimensional simulation according to the FDTD method. As a result, it was proven that a single peak occurs at a wavelength $\lambda_1$=1.587 μm in the photonic band.

The relationship between the beam size and the optical coupling efficiency to the line defect optical waveguide 13 was examined by inputting a Gaussian beam having a wavelength of $\lambda_1$=1.587 μm perpendicularly to the slab surface from above the point defect 14. The result is shown in FIG. 3. The optical coupling efficiency rapidly decreased as the beam size increased, and the optical coupling efficiency was 0.02% when the beam size was 6.7 μm.

COMPARISON EXAMPLE 2

Figure 21:
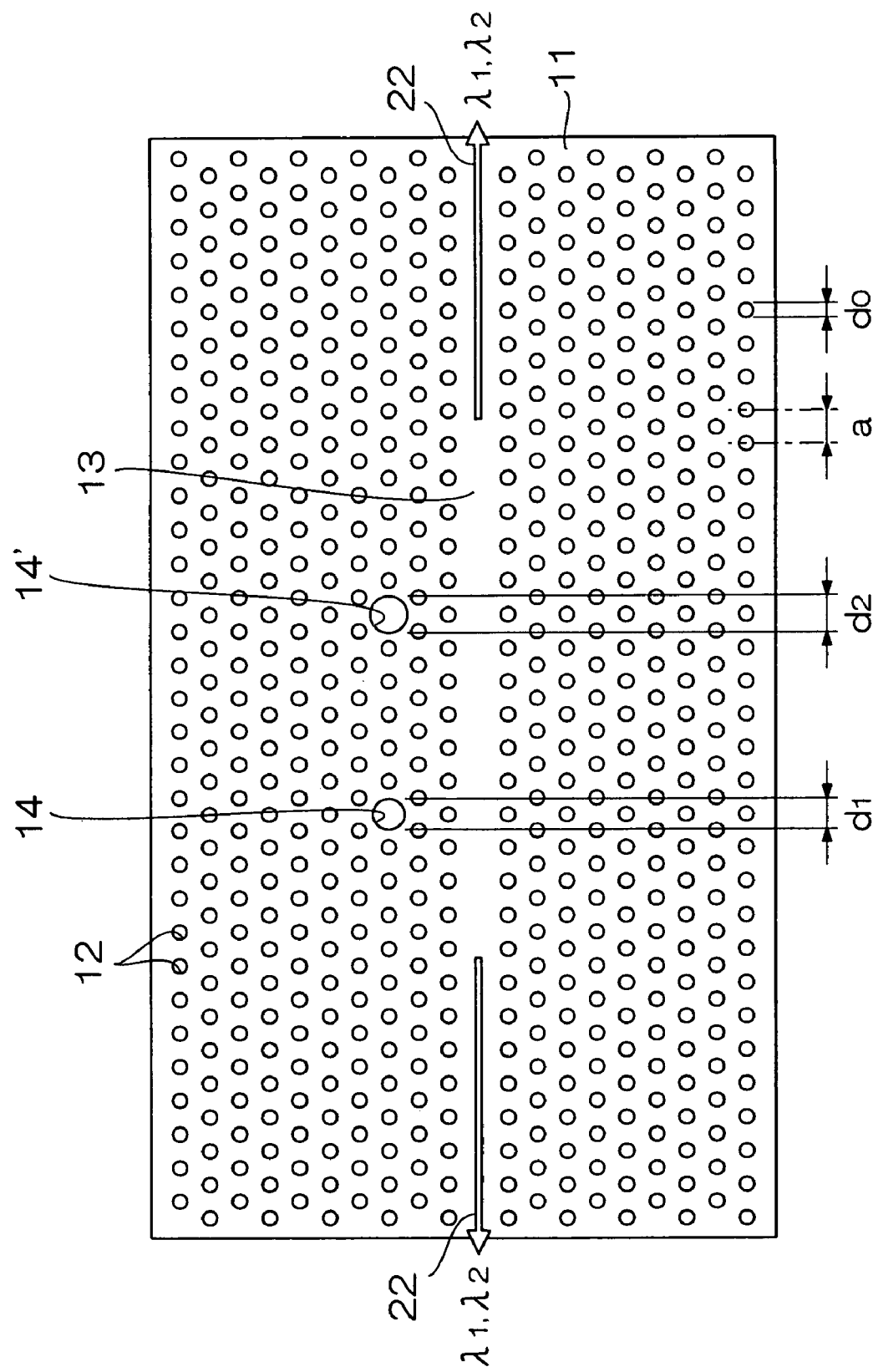
FIG. 21 is a plan view of a two-dimensional photonic crystal slab (an example of the prior art) in which a line defect optical waveguide and two point defects of different sizes spaced apart from each other are formed.

A two-dimensional photonic crystal slab was fabricated in the same manner as in the embodiment 1 except that there are formed two point defects. The structure is shown in FIG. 21.

The diameters $d_1$ and $d_2$ of the two point defects 14 and 14' were 0.47 μm and 0.48 μm, respectively, and the point defects were placed in the third row from the line defect optical waveguide 13, spaced apart from each other by a six-period length (6a=2.52 μm) in parallel with the line defect optical waveguide 13. The energy levels of the photonic band gap and the defects in the photonic band gap were examined by three-dimensional simulation according to the FDTD method. As a result, it was proven that a peak due to the point defect 14 occurs at a wavelength $\lambda_1$=1.587 μm and a peak due to the point defect 14' occurs at a wavelength $\lambda_2$=1.563 μm in the photonic band. The wavelengths $\lambda_1$ and $\lambda_2$ were the same as those in the case where each of the point defects 14 and 14' is formed individually.

The optical coupling efficiency to the line defect optical waveguide 13 was examined by inputting a Gaussian beam composed of two kinds of light having a wavelength of $\lambda_1$=1.587 μm and a wavelength of $\lambda_2$=1.563 μm perpendicularly to the slab surface from above the point defects 14 and 14'. When the beam size was 6.7 μm, the optical coupling efficiency was 0.01% for both the wavelengths of $\lambda_1$=1.587 μm and $\lambda_2$=1.563 μm.

From the embodiment 1 and the comparison example 1, the following conclusions are obtained.

As can be apparently seen from FIG. 3, as the beam size increases, the optical coupling efficiency gently decreases in the embodiment 1, while the optical coupling efficiency rapidly decreases in the comparison example 1. Therefore, when the beam size is approximately equal to or more than 1.5 μm, the optical coupling efficiency is higher in the embodiment 1 than in the comparison example 1. In actual, the core diameter of single-mode optical fibers ranges from about 6 to 10 μm. In such a beam size range, a plurality of point defects (defect holes) formed close to each other can provide about ten times higher optical coupling efficiency than only one point defect. This can be considered to be due to the fact that a plurality of point defects formed close to each other can provide a larger area for interaction with the incident light.

In the case where only one point defect is formed as in the comparison example 1, the defect energy level appears at the wavelength of 1.587 μm. However, in the embodiment 1 in which a plurality of point defects are formed around the point defect in the comparison example 1, the defect energy levels do not appear at the wavelength of 1.587 μm, and a plurality of energy levels appear at different wavelengths. It can be considered that such a plurality of energy levels appear because the defect energy levels increases as the number of the point defects, and the defect energy level that would otherwise appear at 1.587 μm disappears because the plurality of point defects formed close to each other interact with each other, so that the defect energy levels are mixed to provide new energy levels.

From the comparison example 2 and the embodiment 5, the following conclusions are obtained.

In the comparison example 2, light of different wavelengths is coupled to the line defect optical waveguide via the point defects 14 and 14'. In the structure in the comparison example 2, it is necessary that the two point defects do not interact with each other. Thus, the two point defects are formed at a certain distance from each other. The beam-size dependency of the optical coupling efficiency of the light of the wavelengths associated with the respective point defects to the line defect optical waveguide is the same as in the case where each of the point defects is formed solely (as in the comparison example 1). Therefore, in the case where light containing two or more components of different wavelengths is input through one optical fiber, the optical coupling efficiency is reduced, compared with the case where a plurality of point defects are formed close to each other (embodiment 5).

As can be seen from the above description, when a plurality of point defects close to each other are used, because of the interaction between the point defects, optical coupling to the line defect optical waveguide occurs at a plurality of wavelengths, and the optical coupling efficiency for an incident beam size of several micrometers or more is higher than in the case of only one point defect.

In addition, as can be apparently seen from the embodiment 6, the structure in which the precision requirement of alignment of the optical fiber with the photonic crystal having an array of point defects formed therein is relaxed to no less than the beam size is provided by taking advantage of the periodic structure of the photonic crystal to form a plurality of point defects close to each other and is proposed for the first time by the present invention.

Figure 22:
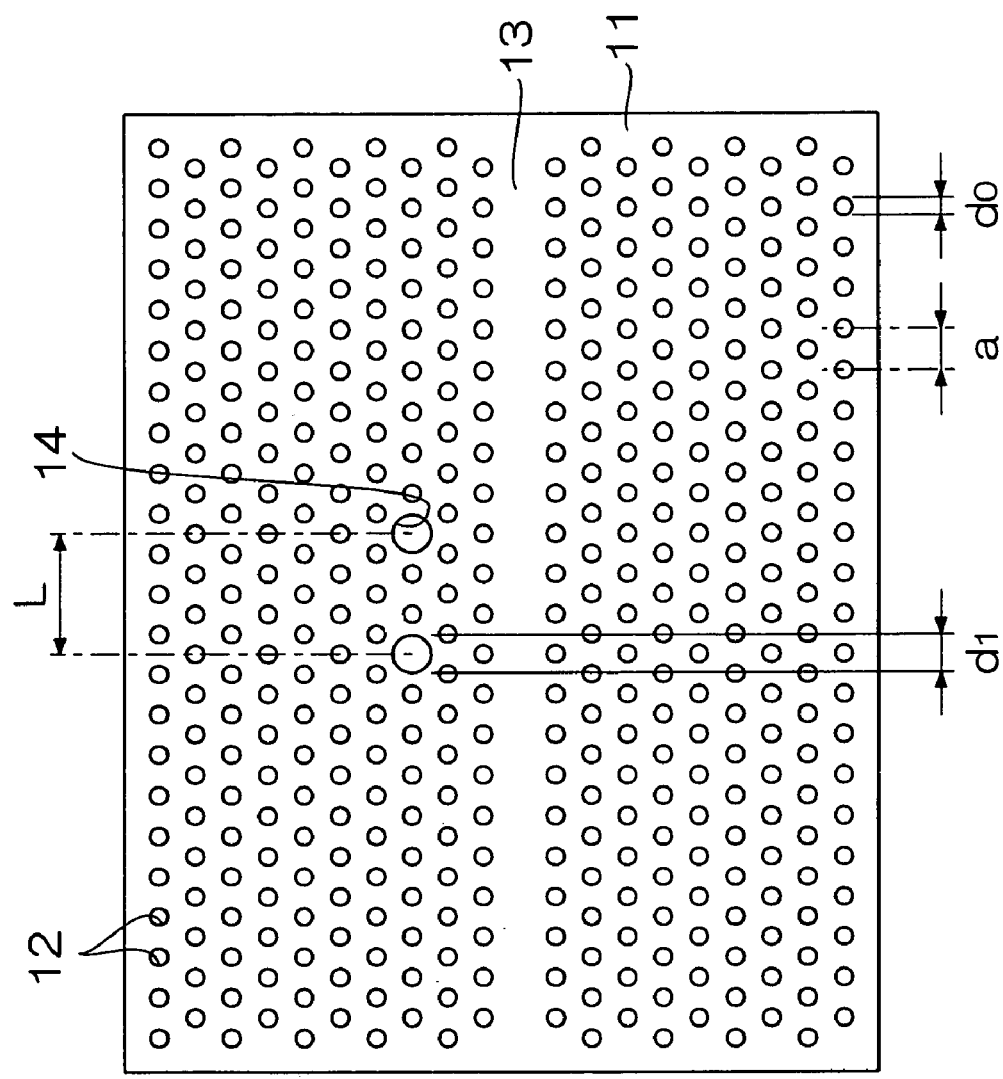
FIG. 22 is a plan view of a two-dimensional photonic crystal slab in which a line defect optical waveguide and two point defects of the same size are formed.
Figure 23:
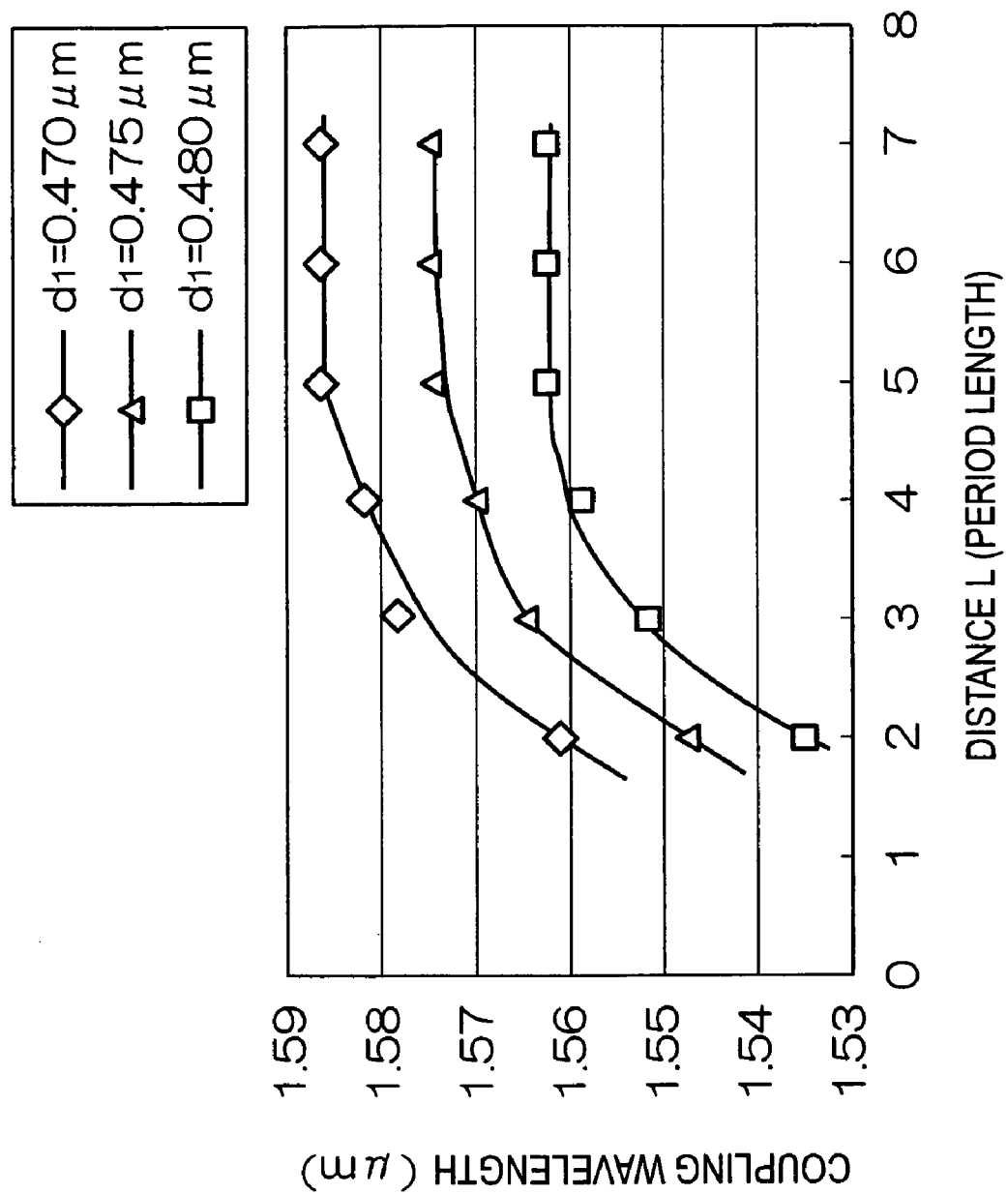
FIG. 23 is a graph showing relationships between the distance between point defects and the coupling wavelength for different diameters of the point defects for the structure shown in FIG. 22.

The optical coupling wavelength can be controlled by changing the distance between or arrangement of point defects, the number of point defects, and the combination of the shape of each point defect. For example, in the case where two point defects 14 having a diameter $d_1$ are formed as shown in FIG. 22 (which is the same structure as that in the comparison example 1 except that two point defects 14 of the same diameter are formed), by reducing the distance L between the two point defects 14, the coupling wavelength can be shifted toward shorter wavelengths as shown in FIG. 23. Besides, by changing the diameter $d_1$ the coupling wavelength can be shifted. As an example, FIG. 23 shows relationships between the distance L and the coupling wavelength in the cases of $d_1=0.47$ μm, 0.475 μm, and 0.48 μm.

As can be seen from FIG. 23, for example, when a coupling wavelength of 1.57 μm is desired, the diameter $d_1$ of the point defects can be 1.475 μm, and the distance L between the point defects can be four-period length (4a). While a case of two point defects has been described above, also in the case where three or more point defects are formed, any coupling wavelength can be achieved by controlling the distance between the point defects or the size of each point defect. In addition, while the point defects 14 shown in FIG. 22 are centered on the corresponding lattice points, the centers of the point defects can be shifted from the corresponding lattice points to control the coupling wavelength. In addition, it can also be seen from FIG. 23 that, in the case where the distance L between the point defects is equal to or greater than five-period length (=5a), the coupling wavelength is equal to 1.587 μm ($d_1=0.47$ μm)

in the case where only one point defect is formed (comparison example 1), and interaction between the point defects does not occur.

As described above, the positions of the point defects may be displaced from the periodic refractive index structure of the photonic crystal, which is a base material. Furthermore, while the two-dimensional photonic crystal slab is made of silicon, and the periodic refractive index structure is a triangular lattice arrangement in the above description, the material and periodic refractive index structure of the two-dimensional photonic crystal slab are not limited to particular ones, and any material and periodic refractive index structure can be used as far as there exists a photonic band gap.

In addition, while light is input externally in the embodiments described above, the same photonic crystal structure and defect arrangement can be used also in the case where light is output externally. The size of the region in which a plurality of point defects are formed is equal to or greater than the wavelength of the incident light input from the external optical system. In the case where light is output externally, the size of the region in which a plurality of point defects are formed is equal to or greater than the wavelength of the light output to the external optical system.

The optical connector and the optical coupling method according to the present invention can be applied to an optical element for long-distance transmission that places importance on low coupling loss. However, the optical connector and the optical coupling method according to the present inventions can be more suitably applied to an element for short-distance transmission that is activated by on/off of an optical signal which can operate with low light intensity and places importance on the light intensity being independent of the precision of alignment with the optical fiber (that is, low implementation cost).

What is claimed is:

1. An optical connector used for inputting light to an optical element from an external optical system or outputting light from an optical element to an external optical system, comprising:
    a photonic crystal having a periodic refractive index structure,
    wherein an optical waveguide to be optically coupled to said optical element and a region in which a plurality of defects are formed at intervals equal to or less than four times the refractive index period of the photonic crystal are formed in the photonic crystal,
    said external optical system and said optical waveguide are optically coupled to each other via said region, and
    said region has a size equal to or greater than the wavelength of the light input from the external optical system or the wavelength of the light output to said external optical system.

2. The optical connector according to claim 1, wherein said plurality of defects are periodically arranged.

3. The optical connector according to claim 1, wherein said optical waveguide is coupled to said region at one end thereof.

4. The optical connector according to claim 1, wherein said optical waveguide passes through said region.

5. The optical connector according to claim 1, wherein said optical waveguide is adjacent to said region.

6. The optical connector according to claim 3, wherein a plurality of optical waveguide are formed.

7. The optical connector according to claim 4, wherein a plurality of optical waveguide are formed.

8. The optical connector according to claim 5, wherein a plurality of optical waveguide are formed.

9. An optical coupling method, comprising:

a step of forming, in a photonic crystal having a periodic refractive index structure, an optical waveguide and a region in which a plurality of defects are formed at intervals equal to or less than four times the refractive index period of the photonic crystal, the region having a size equal to or greater than the wavelength of light input from an optical fiber;

a step of inputting light containing a plurality of components of different wavelengths to said region from one optical fiber opposed to said region; and a step of optically coupling the plurality of components of different wavelengths of the incident light to said optical waveguide from said region.

10. An optical coupling method, comprising:

a step of forming, in a photonic crystal having a periodic refractive index structure, an optical waveguide and a region in which a plurality of defects are formed at intervals equal to or less than four times the refractive index period of the photonic crystal, the region having a size equal to or greater than the wavelength of light output to an optical fiber;

a step of optically coupling a plurality of components of different wavelengths of light having propagated through said optical waveguide to said region; and a step of outputting the light containing the plurality of components of different wavelengths from said region to one optical fiber opposed to said region.

11. An optical element that incorporates an optical connector according to any of claims 1 to 8.

* * * * *